INVENTOR.
Robert B. Trousdale
BY
J. L. Bowes
Attorney

June 10, 1958 R. B. TROUSDALE 2,838,610

ELECTRONIC TELEPHONE SYSTEM

Filed July 26, 1952 13 Sheets-Sheet 2

INVENTOR.
Robert B. Trousdale
BY
T. L. Bowes
Attorney

ELECTRONIC TELEPHONE SYSTEM

Filed July 26, 1952 13 Sheets-Sheet 3

INVENTOR.
Robert B. Trousdale
BY
T. L. Bowes
Attorney

ELECTRONIC TELEPHONE SYSTEM

INVENTOR.
Robert B. Trousdale
BY
T. L. Bowes
Attorney

June 10, 1958 R. B. TROUSDALE 2,838,610

ELECTRONIC TELEPHONE SYSTEM

Filed July 26, 1952 13 Sheets-Sheet 5

INVENTOR.
Robert B. Trousdale
BY
T. L. Bowes
Attorney

June 10, 1958 R. B. TROUSDALE 2,838,610

ELECTRONIC TELEPHONE SYSTEM

Filed July 26, 1952 13 Sheets-Sheet 6

INVENTOR.
Robert B. Trousdale
BY
T. L. Bowes
Attorney

INVENTOR.
Robert B. Trousdale
BY
J. L. Bowes
Attorney

INVENTOR.
Robert B. Trousdale
BY
J. L. Bowes
Attorney

June 10, 1958 R. B. TROUSDALE 2,838,610

ELECTRONIC TELEPHONE SYSTEM

Filed July 26, 1952 13 Sheets-Sheet 9

INVENTOR.
Robert B. Trousdale
BY
T. L. Bowes
Attorney

INVENTOR.
Robert B. Trousdale
BY J. L. Bowes
Attorney

INVENTOR.
Robert B. Trousdale
BY
J. L. Bowes
Attorney

INVENTOR.
Robert B. Trousdale
BY T. L. Bowes
Attorney

INVENTOR.
Robert B. Trousdale
BY
J. L. Bowes
Attorney 2,838,610

ELECTRONIC TELEPHONE SYSTEM

Robert B. Trousdale, Rochester, N. Y., assignor, by mesne assignments, to General Dynamics Corporation, a corporation of Delaware Application July 26, 1952, Serial No. 301,087

19 Claims. (Cl. 179—15)

The present invention relates to a telephone system, and, more particularly, to an electronic telephone system for selectively setting up private two-way communication connections between different pairs of lines of the system. In particular, the present invention is directed to certain improvements in a fully automatic electronic telephone system of the improved form disclosed and claimed in a co-pending application of Robert B. Trousdale and Frank A. Morris, Serial No. 134,974, filed on December 24, 1949, now Patent No. 2,773,934, and assigned to the same assignee as the present invention.

Basically, the electronic telephone system disclosed and claimed in the above-identified application utilizes a system of multiplexing; namely, pulsed sampling effectively at an ultra-sonic rate of the control and intelligence signals produced at each substation of the system, to provide signal channel separation. Specifically, each line or substation of the system is assigned a particular pulse time position in each of repetitively pulse frames each comprising one hundred pulse time positions. Intelligence and control signals developed at any one substation of the system are sampled only in the particular pulse time position assigned to the particular substation and the samples are carried through the signal transmitting components of the system as far as the connector stage on multiplexer signal pulses occurring in this particular time position. In the connector stage the control or intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multi-plexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of tens lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

One of the problems encountered in an electronic system of the type described above is that of maintaining the line finder equipment operatively associated with the calling line in a positive and reliable manner while employing multiplexer signal pulses of sufficiently small amplitude that the signal modulation thereof does not exceed the control grid swing of conventional amplifying and gating tubes. The coincidence tube circuits and the +B switching circuit in a line finder such as described in the above identified application, require large amplitude multiplexer pulses for positive and reliable control thereof, whereas the signal transmission components of the system require relatively small amplitude multiplexer pulses. It has also been found desirable to minimize the loading on the multiplexer portion of the system to reduce noise disturbances and cross talk between the different lines feeding into this multiplexer.

Accordingly, it is an object of the present invention to provide a new and improved electronic telephone system wherein positive and reliable control of the linkage engaged during the setting up of a call is provided.

It is another object of the present invention to provide a new and improved electronic telephone system in which the line finders are operatively associated with calling lines of the system in a positive and reliable manner.

It is a further object of the present invention to provide a new and improved electronic telephone system wherein novel facilities are provided for reducing the loading effect on the signal multiplexing portions of the system while providing positive and reliable control of the signal linkage portions of the system.

It is a still further object of the present invention to provide a new and improved electronic telephone system wherein the signal multiplexing equipment is isolated from the line finding equipment while permitting distorsionless transmission of the multiplexer signal pulses through the signal transmission linkage of the system.

Another problem encountered in a decimal type coincidence line finder such as described in the above-identified application wherein calling line identification is performed by the combined action of tens and units coincidence tube circuits, is the false identification of a calling line by the line finder equipment. In such a decimal type coincidence finder a calling line is identified by coincidence between a pulse occurring in the time position assigned to the calling line and both a tens gating pulse occurring in the tens time position of the calling line and a units gating pulse occurring in the units time position of the calling line. For example, line 32 is identified by coincidence between the signal pulse and both the 3X tens gating pulse and the X2 units gating pulse.

During the identification period, signal pulses from several lines may enter the line finder and will compete for recognition. While ordinarily the line occurring first in time position will be recognized first, it has been found that in some instances the different characteristics of the individual tubes in the coincidence tube circuits may result in a preference for one of these tubes, giving rise to false identification in some cases. For example, if the lines 32 and 23 are competing for recognition, the 3X tens coincidence tube may be more sensitive than the 2X tens coincidence tube and will fire first despite its later time position. At the same time, the X3 units coincidence tube made be preferred over the X2 units coincidence tube and will also fire first. In such case line 33 will be falsely identified by incorrectly combining information supplied by lines 32 and 23. The line finder will, of course, release because no signal pulses occur in the line 33 time position. However, it has been found that the line finder may repeat this false identification and continue to seize and release so long as a simultaneous calling condition exists.

Accordingly, it is another object of the present invention to provide a new and improved electronic telephone system wherein line finder facilities are provided in which continued false identification of the calling line is positively prevented.

It is a further object of the present invention to provide a new and improved line finder for use in an electronic telephone system in which there is provided means for positively preventing false identification of the calling line.

It is a still further object of the present invention to provide a new and improved decimal type coincidence line finder for use in an electronic telephone system in which identification of the tens and units time positions of the calling line is performed in sequence to prevent false identification of the calling line.

The invention, both as to its organization and method of operation, together with further objects and advantages thereof, will best be understood by reference to the following specification taken in connection with the accompanying drawings, in which:

Figs. 1, 2, 3, and 4, when arranged in the manner shown in Fig. 5, diagrammatically illustrate an electronic telephone system embodying the principles of the present invention;

Figs. 2A and 2B when laid end to end in the order named diagrammatically illustrate the components of one of the finder-connector links of the system shown in Figs. 1 to 4, inclusive;

Figs. 6 and 7, when laid end to end in the order named, comprise a schematic diagram illustrating the details of the buffer amplifier and line finder embodied in the system shown in Figs. 1 to 4, inclusive;

GENERAL DESCRIPTION OF THE SYSTEM

Figure 4:
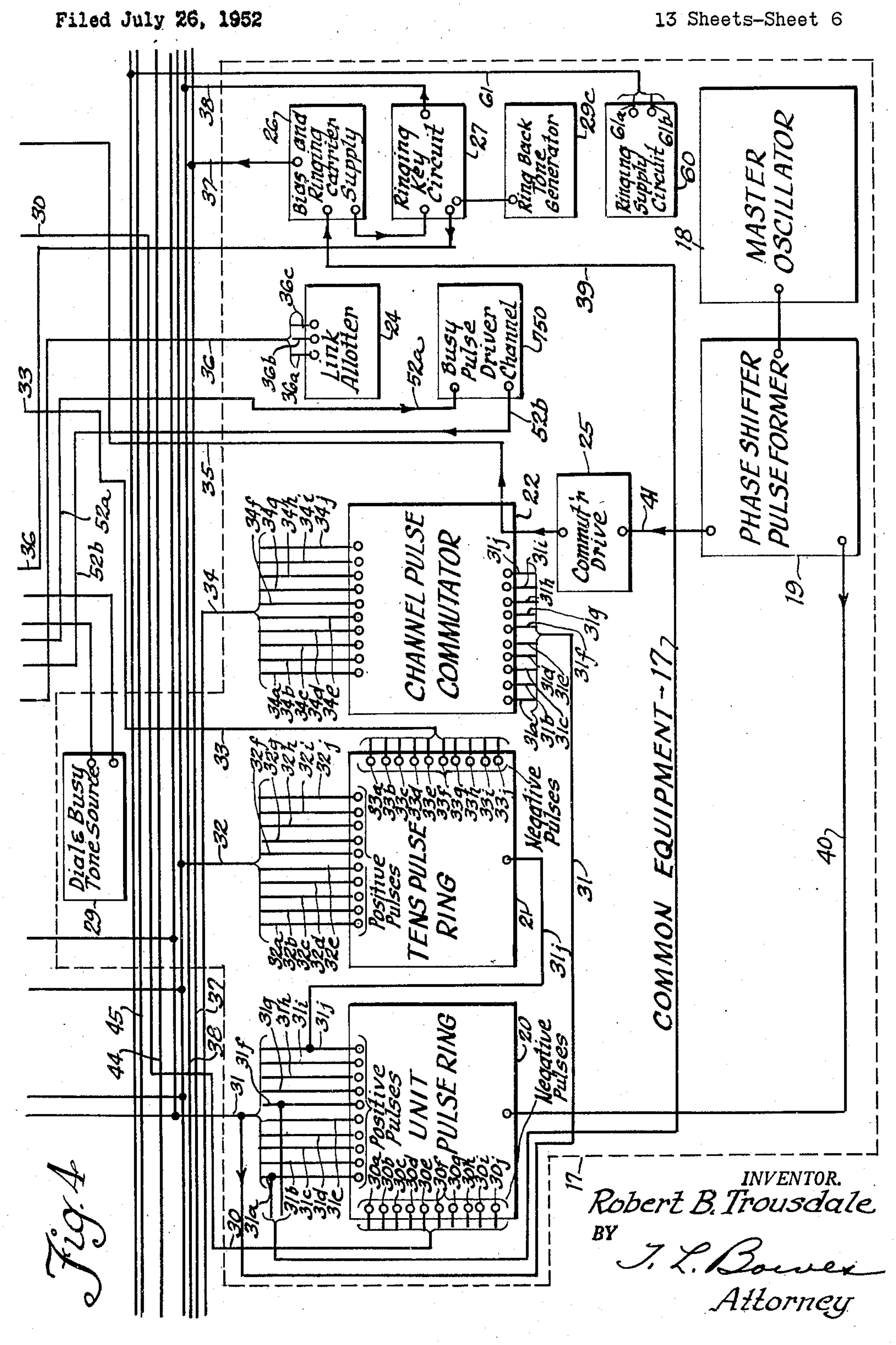

Referring now to the drawings and more particularly to Figs. 1, 2, 3 and 4 thereof, the present fully automatic electronic telephone system is there illustrated as comprising line circuits 10, 16, etc., individual to the one hundred lines of the system, a multiplexer 11 of which only one is required in the system, a buffer amplifier 190 of which only one is required in the system, a plurality of identical finder-connector links 12, 13 and 14, a distributor 15 of which only one is required in the system, and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by their directory number designations 23 and 32 and extend to the substations A and B, respectively. Each line circuit performs the functions of repeating intelligence or control signals from its associated substation to a corresponding one of the gate circuits in the multiplexer 11, repeating intelligence signals derived from a particular gate circuit of the distributor 15 to its associated substation, and of responding to ring start signals derived from one of the connectors **12*b*, 13*b* or 14*b* by way of the distributor 15 to transmit ringing current to the associated substation on a call incoming thereto. To perform these functions, the line circuit 10 is connected by way of a conductor 53 to one of the gate circuits provided in the multiplexer 11, and is connected by way of the conductors 44*a* and 44*b* forming the illustrated cable 44 to one of the gate circuits provided in the distributor 16. The line circuit 10 is also connected to certain components of the common equipment 17 in the manner described below. Similarly, the line circuit 16 is connected by way of the conductors 54*a* and 54*b* to one of the gate circuits in the distributor 15 and by way of the conductor 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and distributor 15 and on a common basis to certain components of the common equipment 17**.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the connectors of the plurality of links 12, 13 and 14 and the common buffer amplifier 190. To this end, the output terminals of the multiplexer 11 are connected by way of the common conductor 50 to the multiplexer input terminals of each of the connectors **12*b*, 13*b* and 14*b* and also to the input terminal of the buffer amplifier 190. In reverse manner, the distributor 15 performs the function of repeating intelligence and control signals derived from the connectors 12*b*, 13*b* and 14*b* in pulse time positions corresponding to particular calling and called lines to the line circuits respectively terminating the lines. To this end, the input terminals of the distributor are connected by way of the common conductor 51 to the output terminals of each of the connectors 12*b*, 13*b* and 14*b*. In performing the described functions, the multiplexer 11 and the distributor 15 are controlled by certain components of the common equipment 17** in the manner hereinafter explained.

The buffer amplifier 190 performs the function of isolating the multiplexer 11 from the finders **12*a*, 13*a* and 14*a* of the system and provides relatively large finder drive pulses corresponding to the multiplexer signal pulses and these finder drive pulses are transmitted over the conductor 50*a* to the finders 12*a*, 13*a* and 14*a*** of the system.

The finders of the various links, such, for example, as the finder **12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. In accordance with the present invention the finder 12*a*** is provided with facilities for positively preventing false identification of the calling line time position.

To advise the connector of the pulse time position assigned to the calling line, the finder **12*a* transmits finder gate pulses to the connector in this pulse time position over the conductor 12*d*. The finder 12*a* also performs the function of conditioning its associated connector 12*b* for operation when the link 12** is definitely associated with a calling line to handle the call initiated on the line.

This is accomplished through operation of the finder 12a to impress operating anode potentials upon a plurality of the tubes in the connector 12b over the +B switch conductor 12c.

When operatively associated with a particular calling line, the finder 12a also performs the function of guarding the calling line against intrusion on an incoming call to the line. This is accomplished through operation of the finder 12a to feed busy pulses occurring in the particular pulse time position assigned to the calling line with which the finder is operatively associated to a common busy conductor 52 which is multiplied to each of the finders and connectors of the system.

To perform the above functions in the manner fully explained below, the finder 12a comprises (see Figs. 2A, 6, 7, 8 and 8A) a pulse input circuit 200, a +B switching circuit 201, a pulse combining circuit 202, tens and units coincidence tube circuits 203 and 204, and a finder pulse forming circuit 205. In addition, the finder 12a, in one embodiment thereof (Fig. 8), includes a false identification prevention circuit 208 which operates to prevent the false identification of a calling line.

Each of the connectors 12b, 13b and 14b performs a plurality of different functions. Thus the connector 12b, for example, is controlled by finder gate pulses delivered thereto over the conductor 12d to accept and respond to signal bearing multiplexer pulses occurring in the pulse time position corresponding to the calling line with which the link is associated. It also responds to the application of operating anode potential to the conductor 12c and to the finder gate pulses appearing on the conductor 12d to feed a dial tone signal to the distributor 15 on connector signal pulses occurring in the pulse time position assigned to the calling line with which it is operatively associated, thereby to return the usual dial tone signal to the calling subscriber. This connector 12b also responds to dial pulses originating at the calling line with which the link 12 is operatively associated to select the particular pulse time position assigned to the called line. Incident to the selection of this time position, the connector 12b conditions itself to accept signal carrying pulses from the multiplexer 11 which occur in the pulse time position corresponding to the selected called line, to store the intelligence carried by these pulses, and to retransmit the intelligence to the distributor 15 on connector signal pulses occurring in the pulse time position corresponding to the calling line with which the link 12 is operatively associated. In effect, therefore, the connector functions to shift signal carrying pulses from the pulse time position assigned to the calling line to the pulse time position assigned to the called line, and also to shift return signal pulses carrying intelligence derived from the called line from the particular pulse time position assigned to the called line to the particular pulse time position corresponding to the calling line. In addition, the connector 12b performs the auxiliary functions of terminating dial tone transmission to the calling substation when the first line selecting impulse is dialed into the connector; feeding busy pulses to the busy conductor 52 in the pulse time position assigned to the called line, thereby to guard the called line against seizure through another link; testing the pulse time position assigned to the called line to determine the idle or busy condition of that line; transmitting busy tone carrying pulses to the distributor 15 in the pulse time position assigned to the calling line in the event the called line tests busy, transmitting a ring start signal by way of the distributor 15 to the line circuit terminating the called line in the event the called line tests idle, concurrently transmitting ring-back tone modulated pulses to the distributor 15 in the pulse time position assigned to the calling line, thereby to signal the calling subscriber that the called substation is being rung; and terminating the ring start signal and concurrently terminating ring-back tone signal transmission to the calling substation in response to answering of the call at the called substation. The connector 12b is also arranged to release in response to the release of a connection involving the link 12 at the calling substation.

Figure 1:
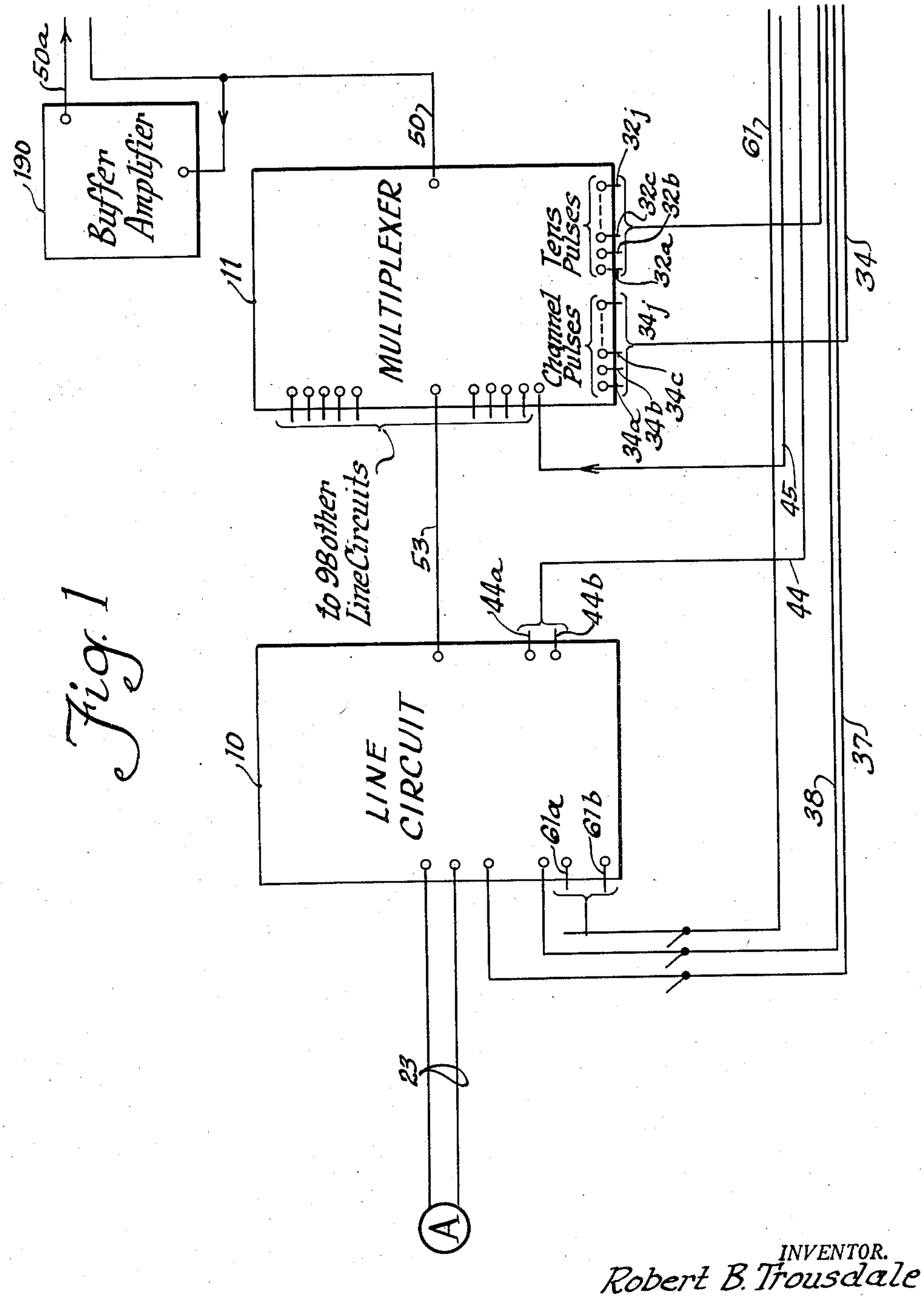
Figure 2:
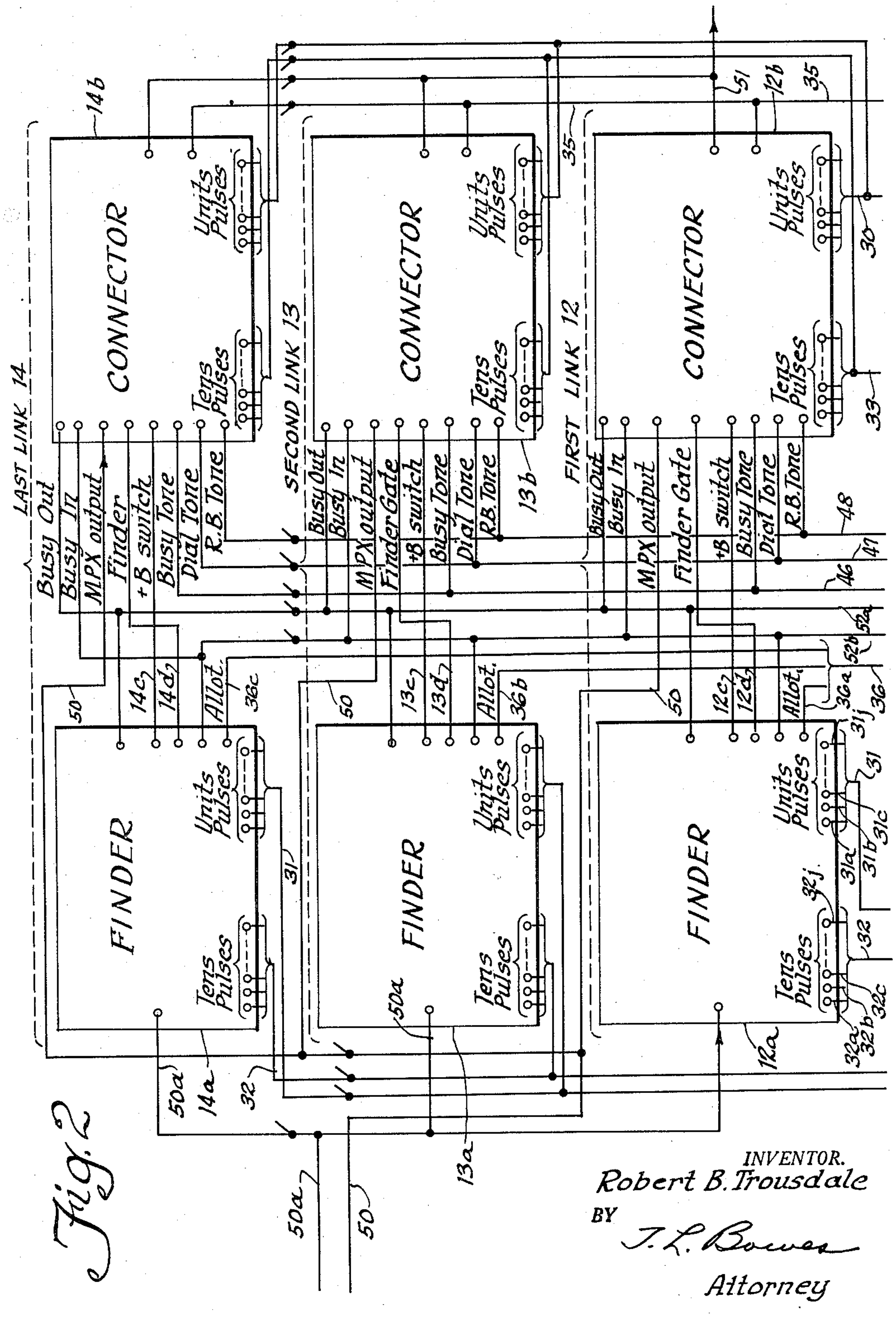
Figure 2A:
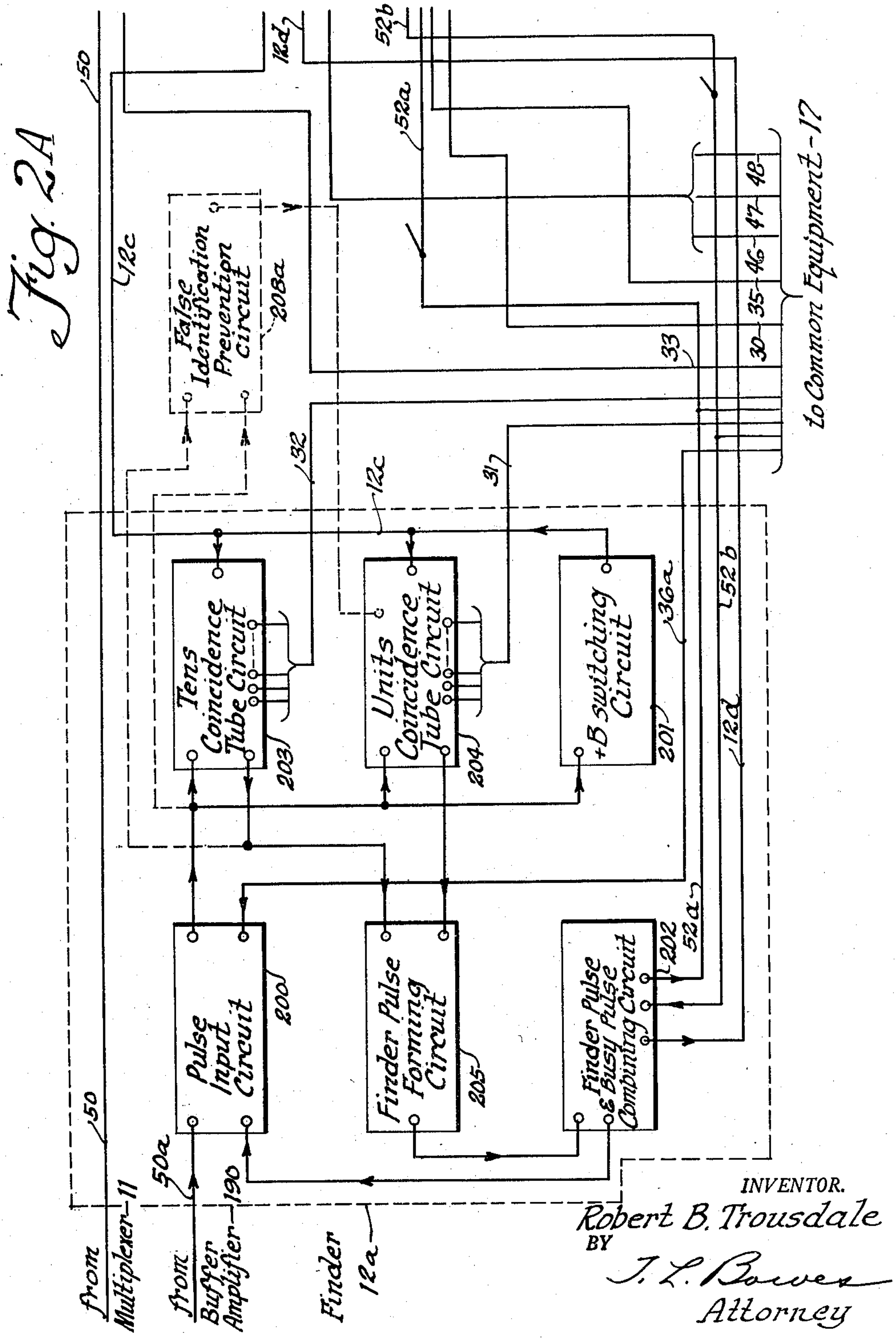
Figure 2B:
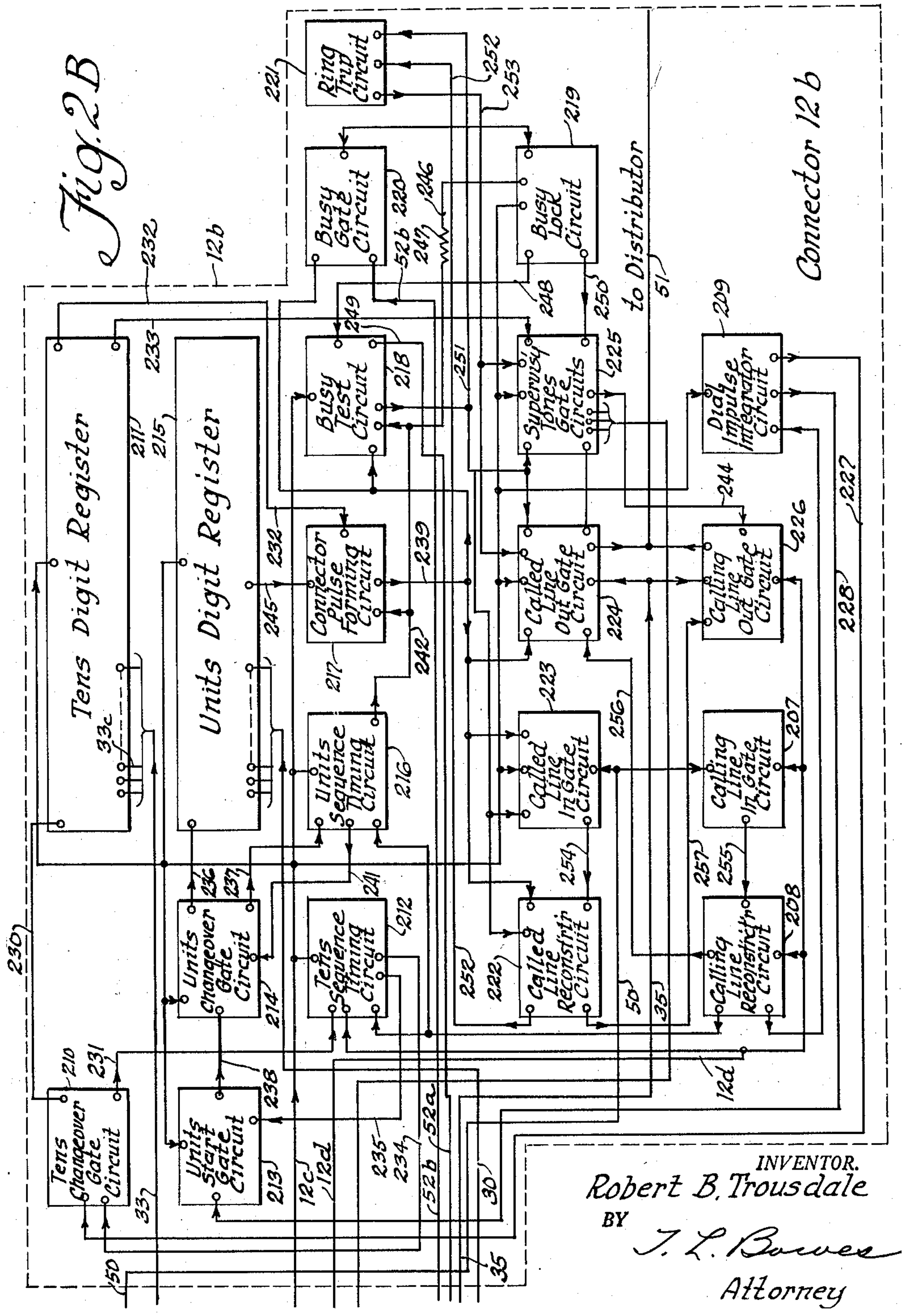
Figure 3:
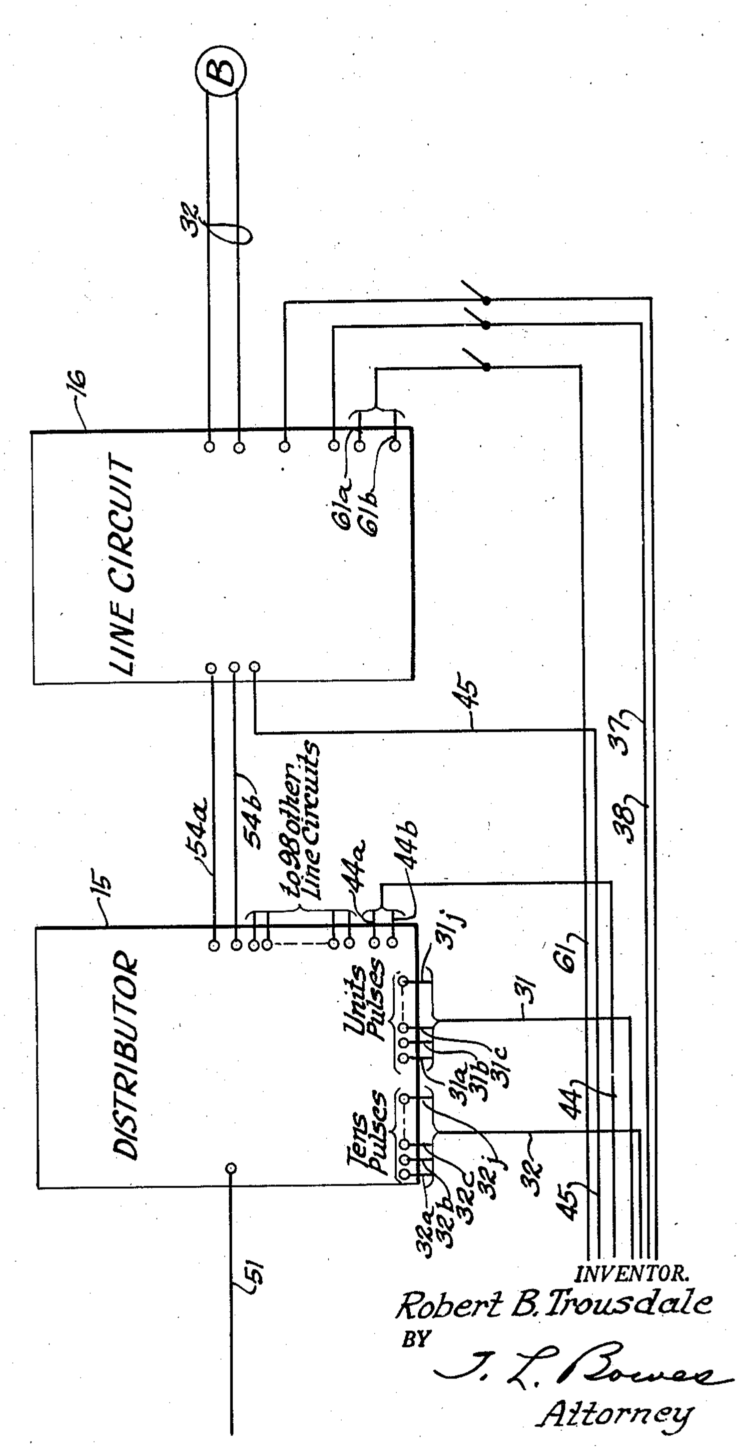

To perform the above-mentioned functions in the manner fully explained below, the connector 12b, as diagrammatically illustrated in Fig. 2B, is provided with a calling line in gate circuit 207 which responds to finder gate pulses transmitted to the connector over the conductor 12d to repeat signal bearing pulses delivered thereto from the multiplexer 11 in the pulse time position assigned to the calling line, and a calling line reconstructor circuit 208 having the function of detecting or reconstructing and storing the intelligence carried by the signal bearing pulses transmitted to the connector from the multiplexer 11 in the pulse time position assigned to the calling line. The connector 12b further comprises a called line out gate circuit 224 for gating to the distributor 15 connector signal pulses carrying the intelligence reconstructed by the circuit 208 in the time position assigned to a particular called line. In addition, the connector 12b includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12d to gate to the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12b additionally comprises a plurality of components for responding to two digits of dial pulses repeated to the connector on multiplexer pulses occurring in the pulse time position assigned to the calling line. In general, the dial pulse responsive equipment of the connector 12b comprises a dial impulse integrator circuit 209 which receives dial impulses from the reconstructor circuit 208, a tens changeover gate circuit 210, a units start gate circuit 213 to which pulses are repeated by the dial pulse integrator circuit 209, tens and units digit registers 211 and 215 which are respectively controlled in accordance with the numerical values of the tens and units digits repeated to the circuits 210 and 213 from the integrator circuit 209, a units changeover gate circuit 214 interposed between the start gate circuit 213 and the units digit register 215, and tens and units sequence timing circuits 212 and 216 which in effect function as the digit counting components of the connector, i. e., initiate certain operations at the ends of the first and second digits dialed into the connector. The connector further comprises a connector pulse forming circuit 217 which is controlled in accordance with the settings imparted to the tens and units digit registers 211 and 215 at the end of a dialing operation to produce the connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy lead 52, a busy lock circuit 219 and a busy gate circuit 220. In addition, the connector comprises supervisory tone gate circuits 225 having the function of gating dial, busy and ring-back tones to the calling line. Finally, the connector comprises a ring trip circuit 221 which is assigned the function of terminating ringing current transmission to a called substation when a call answering operation is performed at the substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continually to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network in the manner more fully explained below. As controlled by the phase shifter and pulse former network 19, the units pulse ring circuit 20 functions sequentially to develop the units pulses which define the pulse time positions of the pulse frames, appear on the conductors within the cables 31 and 30, respectively, and are fed by way of these conductors to the various intelligence transmitting and control components of the system. More specifically, the cable 30 comprises ten units pulse conductors 30*a*, 30*b*–30*j* over which negative units pulses are sequentially transmitted in the order named to the units digits registers 215 of the connectors 12*b*, 13*b* and 14*b*. In time coincidence with the described negative units pulses, the ring circuit 20 produces positive units pulses on the ten units pulse conductors 31*a*, 31*b*–31*j* forming the cable 31, which are transmitted to the units gate circuits of the distributor 15, the units coincidence tube circuits 204 of the finders 12*a*, 13*a* and 14*a* and also to the pulse gate circuits of a channel pulse commutator 22. The positive units pulses developed upon the two conductors 31*a* and 31*f* are also employed to control a bias and ringing carrier supply circuit 26. The positive and negative units pulses are sequentially developed on the units leads 31 and 30, respectively at a frequency rate of 100 kilocycles and each tenth positive units pulse, i. e., each pulse appearing on the units pulse conductor 31*j*, is used to step or trigger a tens pulse ring circuit 21 having the function of developing the positive and negative tens pulses, each of which spans the time interval of ten units pulses. The positive tens pulses as sequentially produced by the ring circuit 21 on the tens pulse conductors 32*a*, 32*b*–32*j* forming the cable 32 are impressed upon the tens pulse gate circuits of the multiplexer 11, the tens pulse gate circuits of the distributor 15 and the tens coincidence tube circuits 203 in the finders 12*a*, 13*a* and 14*a* in the manner more fully explained below. The negative tens pulses as produced by the ring circuit 21 in time coincidence with the positive tens pulses and as sequentially impressed on the tens pulse conductors 33*a*, 33*b*–33*j* forming the cable 33 are impressed on the tens digit registers 211 embodied in the connectors 12*b*, 13*b* and 14*b* in the manner more fully explained below. As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the units pulse gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

The common equipment 17 further comprises a link allotter 24 having the function of developing link allotting pulses of relatively long duration (preferably each pulse persists for at least one millisecond) successively on the link allotting conductors 36*a*, 36*b* and 36*c*. These conductors individually extend to the finder control gate circuits 200 of the finders 12*a*, 13*a* and 14*a* and the pulses impressed thereon perform the function of rendering the respective corresponding links available for use providing the links are not already occupied with calls.

As indicated above, the line circuits 10, 16, etc., individually terminating the lines of the system, perform the function of transmitting ringing current to their respective associated substations. Keyed ringing current transmission from any line circuit terminating a called idle line is effected at a predetermined slow rate of the order of one second on and four seconds off, under the control of the bias and ringing carrier supply circuit 26 and a keying circuit 27 which are embodied in the common equipment 17 and are connected to each of the line circuits 10, 16, etc., over the common multiple conductors 37 and 38. The common equipment also includes dial tone and busy tone sources whiih are collectively indicated at 29 in Fig. 4 of the drawings and are respectively connected by way of the multiple conductors 46 and 47 to the supervisory tone gate circuits 225 of each of the connectors 12*b*, 13*b* and 14*b*. The common equipment further comprises a ringback tone generator 29*c*, the output signal of which is keyed by the ringing keying circuit 27 and supplied to the supervisory tone gate circuits 225 of each of the connectors 12*b*, 13*b* and 14*b* over a common multiple conductor 48. Finally, the common equipment includes a ringing supply circuit 60 which embodies a 20 cycle ringing current source and which is connected by way of two common multiple conductors 61*a* and 61*b* within the cable 61 to each of the line circuits of the system.

In order to render the mode of operation of the system more readily understandable, a pulse chart has been illustrated in Figs. 9 to 12, inclusive, to show the relative widths of the pulses developed by the common equipment components 19, 25, 20, 21 and 22 during two successive pulse frames, as well as the time or phase relationship between the pulses. As there shown, the units pulse ring drive pulses 95*a*, appearing on the conductor 40 are produced by the phase shifter and pulse former circuit 19 along the zero potential reference line 95 at a frequency rate of one megacycle and are of positive polarity. Similarly, the channel pulse commutator drive pulses 96*a* appearing on the conductors 41 and 35 are produced by the phase shifter and pulse former network 19 along the zero potential reference line 96 at the same frequency of one megacycle and are of positive polarity. It will be noted that both the units pulse ring drive pulses 95*a* and the commutator drive pulses 96*a* are very narrow, i. e., persist for very short time intervals, and that the pulses 96*a* are so displaced in time relative to the pulses 95*a* that each commutator drive pulse 96*a* occurs approximately at the middle of the period separating the preceding and succeeding units pulse ring drive pulses 95*a*. The positive units pulses appearing respectively on the units pulse conductors 31*a*, 31*b*–31*j* and the negative units pulses coincidentally appearing on the units pulse conductors 30*a*, 30*b*–30*j* are produced along the zero potential reference lines 62, 63–71. More specifically, the positive units pulses produced along these potential reference lines and appearing on the units pulse conductors 31 are shown in solid lines, whereas the coincident negative units pulses produced along the same reference lines and appearing on the units pulse conductors 30 are shown in dash lines. It will be noted that the units pulses are produced by the units pulse ring circuit 20 at the fundamental frequency rate of one megacycle. However, due to diversion of the pulses successively to different ones of the units pulse conductors *a*, *b–j*, the pulses along any particular zero potential reference line, such, for example, as the line 62, recur only at a frequency rate of one hundred kilocycles. It will also be noted that the units pulses, both positive and negative, are successively produced on the units pulse conductors 30 and 31 in the order of alphabetical designation of these conductors. Thus, successive positive and coincident negative units pulses produced along any particular zero potential reference line, as, for example, those occurring during the units pulse periods *62a*, *62b*, *62c*, etc., along the potential reference line 62, are separated by a time interval equaling the sum of nine units pulse time positions and during which units pulses are produced successively along each of the nine other zero potential reference lines.

The negative tens pulses successively produced by the tens pulse ring circuit 21 on the tens pulse conductors 33*a*, 33*b*–33*j* and the positive tens pulses coincidentally produced on the tens pulse conductors *32a*, *32b*–*32j* are illustrated as appearing along the ten zero potential reference lines 72 to 81, inclusive. Here also, the positive tens pulses are shown in solid lines, whereas the coincidentally produced negative tens pulses are shown in dash lines. It will be noted that each tens pulse persists for a time interval exactly equaling the time required to produce ten units pulses. Thus the positive and negative tens pulse *72a* persists for the duration of the interval in which the ten units pulses *62a*–*71a* are successively produced by the units pulse ring circuit 20. It will also be noted that the starting point of each tens pulse period 72*a*, 73*a*, 74*a*, etc., is exactly coincident with the starting points of the positive and negative units pulses 62*a*, *62b*, *62c*, etc., appearing along the zero potential reference line 62 and impressed upon the units pulse conductors 30*a* and 31*a*, respectively, by the units pulse ring circuit 20. Further, each tens pulse period terminates at the exact instant of termination of the positive and negative units pulses *71a*, *71b*, *71c*, etc., appearing along the zero potential reference line 72 and produced by the units pulse ring circuit 20 on the conductors 30*j* and 31*j*, respectively. The described synchronism between the time positions of the tens pulses and the time positions of the units pulses successively produced on the units pulse conductors by the ring circuit 20 is obtained and maintained by employing the trailing edges of the positive units pulses appearing on the last positive units pulse conductor 31*j* to step or trigger the tens pulse ring 21 on a periodic basis.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the positive and negative units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses *82a*, *82b*, *82c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors *34b*, *34c*–*34f*. It will also be noted that the channel pulses are very narrow in width, having a persistence interval of the order of one fifth the persistence interval of the units pulse time period. However, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22 in the manner more fully explained below. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 9 to 12, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12—10, are defined by the first tens pulse period *72a* of the frame within which the ten units pulse periods 62*a*, 63*a*, 64*a*–71*a* occur. Similarly, the second ten pulse time positions, which are respectively assigned to the lines of the system having the directory number designations 21, 22, 23—20, are defined by the second tens pulse period 73*a* during which the ten units pulse periods *62b*, *63b*, 64*b*–71*b* occur. Again, the third ten pulse time positions, which are respectively assigned to the lines of the system having the directory number designations 31, 32, 33—30, are marked out by the third tens pulse time period 74*a* during which the ten units pulse periods *62c*, *63c*–*71c* occur. Thus it will be understood that the pulse time position of each pulse frame which is assigned to the illustrated line 23 occurs during the second tens pulse interval 73*a* of each pulse frame and is coincident with the units pulse period *64b* of each pulse frame. It will also be apparent that the corresponding signal pulse 84*b* occurs well within the limits of this pulse time position. Similarly, the pulse time position 32 assigned to the illustrated line 32 occurs during the third tens pulse time interval *74a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

OPERATION OF THE SYSTEM AS A WHOLE

Briefly to consider the general mode of operation of the system, it may be assumed that the substation B is called from the substation A during a period when the finder-connector link 12 is idle and is allotted for use under the control of the link allotter 24. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor 53 to the units gating circuit of the multiplexer 11 which individually corresponds to the line 23. The multiplexer 11 responds to this change in magnitude of the controlling bias potential supplied thereto from the line circuit 10 by opening the units gate corresponding to the line 23 to permit the ten channel pulses 84*a*, 84*b*, 84*c*, etc., to pass through this gate. The tens gate circuit controlled by the tens pulse 73*a* corresponding to the ten line subgroup including the line 23, is, however, only opened in coincidence with the signal pulse 84*b* during each pulse frame. Accordingly, only the signal pulses 84*b* occurring during the pulse time positions 64*b* of successive pulse frames, are permitted to pass over the common conductor 50 to the in gate circuits 207 and 223 of the conectors 12*b*, 13*b* and 14*b* in parallel and to the buffer amplifier 190. At this point the pulses transmitted from the multiplexer 11 over the common conductor 50 in the pulse time position 64b may be regarded as multiplexer pulses 84b. These multiplexer pulses are also impressed upon the buffer amplifier 190 and this circuit effectively isolates the multiplexer 11 from the finders 12a, 13a and 14a of the system. More specifically, the amplifier 190 amplifies the multiplexer pulses 84b transmitted thereto over the conductor 50 and supplies the amplified multiplexer pulses, which may now be called finder drive pulses over the conductor 50a to all of the finders 12a, 13a and 14a of the system. Since only the link 12 is conditioned by the allotter 24 and the combining circuit 202 of the finder 12a to handle the call, and the connector 12b of this link is as yet inoperative, only the finder 12a initially responds to these finder drive pulses delivered thereto from the buffer amplifier 190 over the conductor 50a in the described pulse time position 64b.

In the finder 12a the finder drive pulses are repeated by the pulse input circuit 200 to effect substantially immediate operation of the +B switching circuit 201 embodied in this finder, whereby operating anode potentials are delivered to the tubes of the circuits 209, 211, 213, 214, 215, 216, 218, 219, 223, 224 and 225 of the connector 12b over the +B switch conductor 12c, with the result that the connector 12b is conditioned for operation, i. e., conditioned to respond to signal carrying multiplexer pulses delivered thereto from the multiplexer 11 over the conductor 50. Operation of the +B switching circuit in the finder 12a also has the effect of conditioning the tens and units coincidence tube circuits 203 and 204 of this finder for operation under the joint control of the finder drive pulses repeated by the input circuit 200, the positive units pulses developed by the units pulse ring circuit 20 and the positive tens pulses developed by the tens pulse ring circuit 21. In the event that two or more lines are calling at the same time, there is provided in the units coincidence tube circuit 204 means for preventing the continued false identification of the calling line time position. In responding to the tens and units pulses impressed thereon coincidentally with the finder drive pulses, the tens and units coincidence tube circuits 203 and 204 of the finder 12a cooperate with the finder pulse forming circuit 205 and the combining circuit 202 of this finder to produce finder gating pulses which are transmitted over the conductor 12d to the circuits 207, 208 and 226 of the connector 12b and have the effect of initially limiting the response of the connector only to multiplexer pulses 84b appearing in the pulse time position 64b. The combining circuit 202 of the finder 12a also gates busy pulses in the pulse time position 64b which are fed over the common busy lead 52 to each of the other finders and connectors of the system to prevent these finders from responding to multiplexer pulses occurring in this time position. Thus the line 23 is guarded against intrusion on an incoming call. In addition, the pulses gated by the circuit 202 to the conductor 12d are impressed upon the pulse input circuit 200, thereby to render the finder 12a responsive only to finder drive pulses appearing in the pulse time position 64b. Finally, the busy pulses developed in the time position 64b render the finder 12a non-responsive to link allotter pulses impressed upon the allotter conductor 36a, individual to the link 12, by the allotter 24. After the finder 12a has operated to perform the described functions, continued holding of the finder 12a is dependent upon continued acceptance and transmission of finder drive pulses 84b by the pulse input circuit 200, which of course means that the finder will remain associated with the calling line 23 only so long as a calling condition persists on this line.

As indicated above, when the +B switching circuit 201 of the finder 12a operates to apply operating anode potential to the conductor 12c, the circuits 209, 211, 212, 213, 214, 215, 216, 218, 219, 223, 224 and 225 of the connector 12b are conditioned for operation. Immediately anode potential is applied to the dial tone gating tube of the network 225, this network functions to transmit a dial tone signal, derived from the dial tone generator 29b over the conductor 47, to the calling line out gate circuit 226 over the conductor 244. This circuit in responding to the dial tone signal and also to the finder gate pulses delivered thereto over the conductor 12d and the commutator drive pulses 96a delivered thereto over the conductor 35, functions to repeat over the channel conductor 51 to the distributor 15 connector signal pulses modulated in accordance with the dial tone signal in the pulse time position 64b assigned to the calling line. The distributor 15 responds to the connector signal pulses thus transmitted thereto by repeating the same through the tens and units gate circuits thereof over the conductor 44a to the line circuit 10. In the line circuit 10, the dial tone signal is detected and transmitted over the line 23 to signal the calling subscriber that the dialing operation may be initiated.

Two digits of dial impulses must be dialed into the connector 12b in order to effect selection in the connector of the pulse time position 63c assigned to the called line 32. More specifically, the directory number digits "3" and "2" must be dialed successively into the connector 12b to effect selection of the pulse time position 63c. During the open circuit period of each dial impulse, the control bias supplied by the line circuit 10 to that units gate circuit of the multiplexer 11 which corresponds to the calling line 23 is returned to its on hook value to interrupt the transmission of finder drive pulses over the conductor 50a to the pulse input circuit 200 of the finder 12a and of multiplexer pulses over the conductor 50 to the in gate circuits 223 and 207 of the connector 12b.

During the make period of each impulse dialed at the calling substation multiplexer signal pulse transmission from the multiplexer 11 in the pulse time position 64b is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens changeover gate circuit 210 and the units start gate circuit 213 over the conductors 227 and 228, respectively. Pending operation of the tens sequence timing circuit 212, the units start gate circuit 213 is held nonresponsive to the three impulses transmitted thereto by the dial impulse integrator circuit 209 during dialing of the first digit 3 at the calling substation. However, the tens changeover gate circuit functions to repeat the three impulses over the conductors 230 and 231 respectively to the tens digit register circuit 211 and the tens sequence timing circuit 212. In responding to the three impulses thus transmitted thereto, the tens digit register 211 is driven to a setting wherein tens pulses appearing on the negative tens pulse conductor 33c in the third tens pulse time position 74a of each pulse frame may be transmitted through the third tens gate of this register and over conductor 232, to the connector pulse forming circuit 217. Transmission of the three impulses individually corresponding to the three break periods of the first digit dialed at the calling substation over the conductor 231 to the tens sequence timing circuit 212 has the effect of conditioning this circuit to block the tens changeover gate circuit from repeating impulses to the tens digit register 211 during dialing of the second digit and to render the units start gate circuit 213 operative to repeat the pulses delivered thereto by the dial impulse integrator circuit 209 during dialing of the second digit at the calling substation. Immediately the first dial impulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens changeover gate circuit 210 against repeating further impulses transmitted thereto from the dial impulse integrator circuit 209. In assuming this condition, the tens sequence timing circuit 212 also changes the potential level on the conductor 235 to render the units start gate circuit operative to repeat impulses delivered thereto from the dial impulse integrator circuit 209 to the units changeover gate circuit 214 over the conductor 238.

During dialing of the second digit 2 at the calling substation A, the dial impulse integrator circuit 209 responds by transmitting two impulses to each of the gate circuits 210 and 213. As noted above, however, the changeover gate circuit 210 is now blocked against repeating these impulses. The units start gate circuit 213 repeats the two impulses to the units changeover gate circuits 214 over the conductor 238 and the latter circuit repeats the impulses over the conductors 236 and 237, respectively, to the units digit register 215 and the units sequence timing circuit 216. As a consequence, the units digit register is operated or driven to open the second units gate circuit therein, thereby to establish a path for the transmission of units pulses appearing in the time positions *63a*, *63b*, *63c*, etc., to the connector pulse former circuit 217. The two pulses repeated to the units sequence timing circuit 216 over the conductor 237 serve to condition this circuit for operation at the end of the second digit.

At the end of the second digit dialed into the connector *12b* the units sequence timing circuit 216 operates to change the potential level on the conductor 241 to a value such that the units changeover gate circuit 214 is blocked against further pulse transmission therethrough. Concurrently, a potential is applied to the conductor 242 in the units sequence timing circuit 216 which has the effect of rendering the busy test circuit 218 operative to determine the idle or busy condition of the called line by testing the pulse time position *63c* assigned to this line.

The potential applied to the conductor 242 also has the effect of rendering the connector pulse forming circuit 217 operative to mix the tens and units pulses respectively transmitted thereto from the registers 211 and 215 over the conductors 232 and 245 to produce a resultant connector pulse which appears on the conductor 239. More specifically, the tens pulses *74a* appearing on the negative tens pulse conductor *33c* and gated by the tens digit register 211 are transmitted to the connector pulse former circuit 217 over the conductor 232 where they are mixed with the negative units pulses appearing in the time position *63c* which are gated by the units register 215 and transmitted to the circuit 217 over the conductor 245. Mixing of these pulses in the circuit 217 results in the production of a resultant connector pulse which occurs during each pulse frame in the pulse time position 63c assigned to the called line. These pulses are transmitted over the conductor 239 to the connector components 218, 220, 222, 223 and 224.

Effectively, the busy test circuit 218 and the busy lock circuit 219 cooperate to perform the busy test operation in the connector *12b*. More specifically, if the called line 32 is busy, i. e., occupied with a call, busy pulses are present on the common busy conductor 52 in the pulse time position *63c* assigned to the called line. The manner in which such busy pulses are applied to the conductor 52 in another link occupied with the call involving the line 32 will be apparent from the foregoing explanation. These busy pulses are impressed upon the busy test circuit 218 coincidentally with the connector pulses developed by the connector pulse forming circuit 217 and impressed upon the busy test circuit 218 over the conductor 239. Coincidence between the connector pulses and the busy pulses has the effect of preventing the busy test circuit from operating. Thus the busy condition of the called line is indicated.

In the event the called line is busy, the busy lock circuit 219 as controlled over the conductors 242 and 246 and through the resistor 247 from the units sequence timing circuit 216 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone source by way of the conductor 46, the busy gate circuit in the network 225, the calling line out gate circuit 226, the channel conductor 51, the distributor 15 and the line circuit 10 to the calling line. Thus the calling subscriber is advised of the busy condition of the called line.

Assuming that the called line 32 is idle at the time the pulse time position *63c* assigned thereto is selected in the connector in the manner explained above, such busy pulses as may be present on the common busy lead 52 do not occur coincidentally with the connector pulses generated by the connector pulse forming circuit 217 in the pulse time position *63c* assigned to the called line. When coincidence between the connector pulses and the busy pulses is lacking, the busy test circuit operates immediately the first connector pulse is impressed thereon from the connector pulse forming circuit 217 over the conductor 239. In operating, the circuit 218 impresses a positive potential upon the cut-through conductor 251 which is applied to the busy lock circuit 219 to prevent the latter circuit from operating at the end of the busy test interval. The positive potential applied to the cut-through conductor 251 in the busy test circuit 218 when this circuit operates is also applied to the called line out gate circuit 224 to condition the latter circuit to repeat connector signal pulses in the time position *63c* to the distributor 15, and is applied to the busy gate circuit 220 so that connector pulses are released to the busy conductor 52 and is also applied to the network 225 to act as an operating anode potential for the ring-back tone gate tube of this network. The positive potential developed on the cut-through conductor 251 is also applied to the called line in-gate circuit 223 and the called line reconstructor circuit 222, thereby to condition these circuits to accept signals derived from the called line. This feature of making operation of the circuits 223 and 222 dependent upon operation of the busy test circuit to indicate that the called line is idle, is necessary in order to prevent the calling subscriber from listening in on a conversation being held over the called line when the called line is busy.

The positive potential applied to the cut-through conductor 251 is also impressed upon the ring trip circuit 221 and is applied through certain components of this circuit to the ring trip conductor 253 which extends to both the called line out gate circuit 224 and to the ring-back tone gate circuit of the network 225. When this occurs, the ring-back tone gate circuit of the network 225 is rendered operative to transmit the intermittent ring-back tone signal derived from the keying circuit 27 over the conductor 48 to the calling line out gate circuit 226 over the conductor 244. The ring-back tone signal is modulated on the signal pulses developed by the out gate circuit 226 and thus transmitted by way of the conductor 51 and the distributor 15 to the line circuit 10. In the line circuit 10, the ring-back tone signal is detected and transmitted over the calling line 23 to the calling substation. Thus the calling subscriber is signaled that the called substation is being rung.

When the called line out gate circuit 224 is conditioned for operation through application of the described positive potential to the cut-through conductor 251, it responds to the connector pulses impressed upon the connector pulse conductor 239 by connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63*c* assigned to the called line, whereby very narrow connector signal pulses are released over the conductor 51 to the distributor 15 which are well within the limits of the pulse time position 63*c* assigned to the called line. So long as the positive potential applied to the cut-through conductor 251 in the busy test circuit 218 is fed through the ring trip circuit 221 to the ring trip conductor 253, the called line out gate circuit 224 is controlled to release connector signal pulses to the distributor 15 in the pulse time position 63*c* which are approximately fifty percent larger in amplitude than those used to convey intelligence signals to the distributor 15 after the call is answered at the called substation B. These large amplitude signal pulses are diverted by the distributor 15 to the line circuit 16 and serve to signal this line circuit that the ringing operation should start.

More specifically, the large amplitude connector signal pulses are released by the distributor 15 to the line circuit 16 over the conductor 54*a*. In this line circuit, these pulses have the effect of activating the ringing control facilities of the line circuit 16 with the result that ringing current keyed at a slow rate of approximately one second on and four seconds off is transmitted over the line 32 to energize the ringer provided at the called substation B. Ringing of the called substation persists until the call is answered or until the call is abandoned at the calling substation A. Assuming that the call is answered, the line circuit 16 functions to change the magnitude of the control potential supplied over the conductor 45 to the multiplexer 11 with the result that the gate is assigned to the called line 32 in the multiplexer 11 is opened to permit multiplexer pulses 83*c* occurring in the pulse time position 63*c* of each pulse frame to be transmitted through the corresponding tens and units gate circuits of the multiplexer 11 and over the conductor 50 to the multiplexer input terminals of each of the connectors of the system and the buffer amplifier 190.

The multiplexer pulses 83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse former circuit 217. As a consequence, the call answering signal carried thereby is gated to the reconstructor circuit 222 where it is detected to produce a potential on the conductor 252 which has the effect of tripping the ring trip circuit 221. In operating, the ring trip circuit 221 functions substantially to decrease the positive potential on the ring trip conductor 253. The called line out gate circuit 224 responds to this reduction in potential on the conductor 253 by decreasing by approximately fifty percent the amplitude of the connector signal pulses transmitted over the conductor 51 and through the distributor 15 to the line circuit 16. The ringing control facilities of the line circuit 16 respond to this decrease in the amplitude of the connector signal pulses delivered thereto by terminating the transmission of ringing current to the called substation. Thus the ringing operation is arrested. The decrease in the positive potential present on the ring trip conductor 253 which occurs when the ring trip circuit 221 operates also has the effect of closing the ring-back tone signal transmission gate of the network 225, with the result that transmission of the ring-back tone signal to the calling substation is arrested.

Following the described operations in the connector 12*b*, a two-way talking or communication circuit is fully established between the calling substation A and the called substation B. Thus, voice or other signals developed at the substation A and transmitted over the line 23 to the line circuit 10 serve to vary the bias voltage impressed upon the gate circuit of the multiplexer 11 over the conductor 53 directly in accordance with the instantaneous amplitude of such signals. As a consequence, the multiplexer pulses 84*b* released by the multiplexer 11 over the conductor 50 to the connectors of the system in the pulse time position 64*b* are modulated in accordance with the voice or other signals developed at the calling substation A. These signal modulated multiplexer pulses are also fed to the buffer amplifier 190 wherein they are amplified and appear as finder drive pulses on the conductor 50*a*. These finder drive pulses cannot be accepted by any finder of the system other than the finder 12*a* because of the busy pulses fed to the busy conductor 52 from the circuit 205. In the finder 12*a*, the finder drive pulses maintain the +B switching circuit 201 operated to hold the link 12 associated with the line 23. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in the pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 and released by the distributor 15 to the line circuit 16. In the line circuit 16, the signal components of the connector signal pulses are detected and transmitted over the line 32 to the called substation B where they are audibly reproduced by the receiver of the telephone instrument provided at the called substation.

Voice signals developed at the called substation B and transmitted over the line 32 to the line circuit 16 cause the bias potential delivered over the conductor 45 to the gate circuit of the multiplexer 11 which corresponds to the called line 32 to vary in exact accordance therewith. As a consequence, the voice signals are modulated upon the multiplexer pulses 83*c* occurring within the pulse time position 63*c* and released through the units and tens gates of the multiplexer and over the conductor 50 to the connectors of the system. The finder drive pulses corresponding to these signal modulated multiplexer pulses cannot be accepted by any finder of the system for the reason that the finder 12*a* is synchronized to accept only finder drive pulses occurring in the time position 64*b* and the busy pulses fed to the busy conductor 52 in the time position 64b assigned to the called line by the busy gate circuit 220 of the connector 12b prevent the other finders from accepting or responding to these finder drive pulses. In the connector 12b, the signal modulated multiplexer pulses 83c are impressed upon the calling and called line in gate circuits 207 and 223 and are repeated by the circuits 223 over the conductor 254 to the called line reconstructor circuit 222. Due to lack of coincidence between the signal bearing multiplexer pulses 83c and the finder gating pulses impressed upon the calling line in gate circuit 207 over the conductor 12d, the circuit 207 does not gate these pulses to the reconstructor circuit 208. By virtue of the coincidence between the signal bearing multiplexer pulses 83c and the connector pulses appearing coincidentally on the conductor 239, both of which are impressed upon the called line reconstructor circuit 222, this circuit detects or reconstructs and stores the voice signal components carried by the multiplexer pulses 83c. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12d. The voice signal modulated pulses developed in the calling line out gate circuit 226 are released by the distributor 15 in the pulse time position 64b and are diverted to the line circuit 10 through the gating circuit of the distributor which corresponds to the calling line. In the line circuit 10, the signal components of the pulses released by the calling line out gate circuit 226 are detected and transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substations will be transmitted without interference through the switching equipment of the system to the appropriate destination point or substation.

In describing the manner in which the system components 10, 11, 12a, 12b, 15 and 16 are partially or wholly released upon termination of the call, it may be assumed first that the called party at the substation B is the first to hang up. In such case, the bias potential delivered from the line circuit 16 over the conductor 45 to the gating circuit of the multiplexer 11 individually assigned to the called line 32 is restored to its normal value when the called line loop circuit is opened, with the result that multiplexer pulses 83c appearing in the pulse time position 63c are no longer transmitted over the conductor 50 to the connectors of the system and the buffer amplifier 190. Such termination of multiplexer pulse transmission in the time position 63c to the connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63c assigned to the called line continue to be fed to the busy conductor 52 from the busy gate circuit 220 of the connector 12b, thereby to prevent the called line 32 from originating a call or accepting an incoming call. This of course means that if the called subscriber picks up his receiver or hand set before the connection is released at the calling substation A, conversation may be resumed between the calling and called subscribers.

When the calling subscriber disconnects by replacing the receiver or hand set at the substation A on its supporting hook or cradle, the loop circuit extending by way of the line 23 to the line circuit 10 is opened, with the result that the bias potential applied over the conductor 53 to that gate circuit of the multiplexer 11 which individually corresponds to the calling line 23 is restored to its normal value. As a consequence, this gate circuit is biased to terminate the transmission of multiplexer pulses 84b occurring in the pulse time position 64b over the conductor 50 to the connectors of the system and the buffer amplifier 190. When the transmission of finder drive pulses to the pulse input circuit 200 of the finder 12a is thus terminated, this circuit is rendered inactive to repeat pulses to the finder circuits 201, 203 and 204. After a predetermined time interval, measured by the overall time constant of the +B switching circuit 201, this circuit responds to cessation of finder drive pulse transmission thereto by removing the operating anode potential from the conductor 12c. As a consequence, the tens and units coincidence tube circuits 203 and 204 of the finder 12a are restored to normal to interrupt the production of finder gate and busy pulses in the pulse time position 64b by the finder pulse forming circuit 205. Thus, the application of pulses to the combining circuit 202 and hence to the busy conductor 52 in the pulse time position 64b assigned to the calling line 23 is arrested. Termination of pulse transmission to the combining circuit 202 in the time position 64b has the effect of rendering this circuit operative under the control of the link allotter 24 to reassociate the link 12 with another calling line to handle another call. Cessation of busy pulse transmission to the conductor 52 in the pulse time position 64b has the effect of marking the calling line 23 as idle to permit initiation of a second call on this line or seizure of the line on a call incoming thereto.

Removal of operating anode potential from the conductor 12c also has the effect of restoring the component circuits 209, 211, 212, 213, 214, 215, 216, 218, 219, 223, 224 and 225 of the connector 12b to normal, thereby to condition the connector 12b to handle another call. Incident to normalizing of the connector pulse forming circuit 217, connector pulse production on the conductor 239 in the pulse time position 63c assigned to the called line 32 is terminated to arrest the application of busy pulses to the common busy conductor 52 by the busy gate circuit 220 in this pulse time position. Thus the called line is unguarded to free the same for use in initiating another call or accepting a call incoming thereto. It will be noted that normalizing of the identified circuits of the connector 12b has the effect of restoring all components of this connector to the condition which prevailed at the time the link 12 was taken into use to handle the call just described.

DETAILED DESCRIPTION OF THE SYSTEM

In considering the detailed circuitry of the system components briefly described above, operation of these components will be analyzed insofar as possible in terms of functions which they perform in establishing the above described connection between the substation A and the substation B in response to the call initiated at the substation A. Before considering the details of the system components, however, it is pointed out generally that corresponding reference characters have been used throughout the drawings to identify corresponding circuit elements of the system. It is also pointed out that all pulse carrying conductors such, for example, as the signal pulse transmission conductors 50 and 51 are in the form of coaxial cables or transmission lines having low pulse attenuating properties at the pulse frequencies employed. In certain instances the coaxial cables provided to connect two or more components of the system have been illustrated, but it should also be remembered that all the other illustrated pulse carrying conductors are of the proper type. On the other hand, all illustrated conductors which function as direct current potential or audio signal carrying conductors are in the form of open or shielded wire.

Throughout the following detailed description of the system of the present invention the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely functions which will be readily understood by those skilled in the art, have not been identified in the drawings or referred to in the following description of the system components.

As used in this specification, the terms "electronic" and "electronic means" refer to and are intended to define means comprising electron conducting devices, such, for example, as electron tubes, gas tubes, crystal rectifiers, semi-conductors, and the like, together with interconnecting circuit components therefor, and to exclude all electromechanical devices embodying moving mechanical parts such, for example, as relays, stepping switches, and the like.

Also, in order to reduce the complexity of this specification those system components which are substantially identical to the corresponding system components of the copending application of Robert B. Trousdale and Frank A. Morris, Serial No. 134,974, filed December 24, 1949, now Patent No. 2,773,934, and my copending applications, Serial No. 257,712, filed on November 23, 1951, and Serial No. 205,641, filed on January 12, 1951, now Patent No. 2,773,935, will be briefly described herein, reference being had to these copending applications for a complete and detailed description of these system components.

*Master oscillator 18*

This circuit may be identical to the corresponding system component of the above-identified copending application, Serial No. 134,974, and is designed to provide a stable signal output voltage of approximately three volts at a frequency of one megacycle across the output terminals thereof. Preferably, the oscillator 18 is crystal controlled and is provided with relatively low impedance cathode follower output stages for driving a coaxial cable extending to the phase shift and pulse forming circuit 19.

*Phase shift and pulse forming circuit 19*

This circuit may be identical to the corresponding system component described in detail in the copending application, Serial No. 134,974, identified above, and is provided for the purpose of generating the extremely narrow pulses 95*a* and 96*a* (Figs. 9 to 12, inclusive) which are used in sampling the intelligence and control signals in the manner generally described above. Also, the circuit 19 performs the function of driving the units pulse ring circuit 20 and the commutator drive circuit 25 and is arranged to operate from the master oscillator 18 as previously explained. The circuit 19 responds to the sine wave signal delivered thereto from the master oscillator 18 by developing two sets of output pulses on the output conductors 40 and 41 which may be phase shifted with respect to each other over a full 360° phase shift range. This permits placement of the signal sampling pulses within the limits of corresponding units pulses of longer duration in the manner generally explained above.

*Commutator drive circuit 25*

This circuit may be identical to the corresponding system component of the copending application, Serial No. 134,974, identified above, and is provided for the purpose of amplifying the positive pulses appearing on the commutator drive pulse conductor 41 and to act as an impedance matching network. As previously pointed out, the pulses 96*a* produced at the output terminals of this circuit are delivered over the conductor 35 to the channel pulse commutator 22 and to each of the connectors 12*b*, 13*b* and 14*b* of the system. The pulse power requirements of these parallel connected components are fairly severe, which in part necessitate provision of the circuit 25 to amplify the pulses on the conductor 41 sufficiently to satisfy the pulse load requirements of the system.

*Ring circuits 20 and 21*

The units pulse ring circuit 20 and the tens pulse ring circuit 21 are substantially identical to the corresponding system components of the copending application, Serial No. 134,974 identified above. The units pulse ring circuit 20 is provided for the purpose of converting the ring drive pulses 95*a* developed in the ring drive pulse conductor 40 by the circuit 19 into positive and negative units pulses of a finite and greater width than the channel pulses 96*a*, and of diverting or commutating the units pulses thus developed successively to the positive units pulse conductors 31*a*, 31*b*–31*j*, and the negative units pulse conductors 30*a*, 30*b*–30*j*. In a similar manner the tens pulse ring circuit 21 is provided for the purpose of producing tens pulses successively on the positive tens pulse conductors 32*a*, 32*b*–32*j*, and the negative tens pulse conductors 33*a*, 33*b*–33*j*. However, the driving pulses for the tens pulse ring circuit 21 are derived from the tenth units pulse forming stage of the units pulse ring circuit 20. In the alternative, the driving pulses for the tens pulse ring circuit 21 may be derived from the eighth units pulse forming stage, for example, and a phase shift and drive circuit employed to drive the tens pulse ring circuit 21, as described in detail in my copending application, Serial No. 263,264, filed on December 26, 1951, now Patent No. 2,769,085, and assigned to the same assignee as the present invention.

*Channel pulse commutator 22*

This circuit may be identical to the corresponding system component described in detail in the copending application Serial No. 134,974, identified above, and is provided for the purpose of sequentially commutating the pulses developed on the conductor 35 over the conductors 34*a*, 34*b*–34*j* to the multiplexer 11.

*Busy and dial tone sources 29*

These tone sources may be identical to the corresponding system components described in detail in the copending application Serial No. 134,974, identified above, and are provided for the purpose of supplying tone signals which are utilized in the connectors of the system for signalling calling subscribers when the lines to which the calls are routed are tested and found busy and to inform the calling subscriber that the dialing operation may be initiated.

*Ring-back tone generator 29c*

This generator may be identical to the corresponding system component described in detail in the copending application Serial No. 134,974, identified above, and is provided for the purpose of generating a low frequency signal voltage which is used to signal a calling substation that a called substation is being rung. More particularly, this generator is designed to produce a signal voltage having a frequency of approximately 200 cycles per second to which is added a low frequency component of approximately 20 cycles per second. The output of the generator 29*c* is supplied to the ringing keying circuit 27 to provide the conventional ringing sequence of one second on and four seconds off. In this connection it will be understood that the ring-back tone generator 29*c* may be modified substantially as shown in my copending application Serial No. 257,712, identified above, to provide for party line ringing.

*Supervisory carrier supply circuit 26*

This circuit may be identical to the corresponding system component described in detail in the copending application Serial No. 134,974, identified above, and is provided to produce a sine wave signal voltage which is in synchronism with the master oscillator 18 and has a frequency of approximately 100 kilocycles, which is supplied to the various line circuits of the system over the common conductor 37 for supervisory and line ringing operations.

*Link allotter 24*

This circuit may be identical to the corresponding system component described in detail in the copending application, Serial No. 134,974, identified above, and is provided for the purpose of allotting the line finders 12*a*, 13*a* and 14*a* of the system to successive calling lines of the system. It will be understood that a self-allotting system of the type described in my copending application, Serial No. 257,712, identified above, may equally well be employed insofar as the present invention is concerned.

*Ringing supply circuit 60*

This circuit may be identical to the corresponding system component described in detail in the copending application, Serial No. 134,974, identified above, and is provided for the purpose of supplying a ringing frequency of relatively low frequency which is superimposed upon a unidirectional potential and the composite voltage is supplied over the conductors 61*a* and 61*b* to all of the line circuits of the system. In this connection it will be understood that the common equipment 17 may be modified to include party line ringing facilities such as described in my copending application, Serial No. 257,712, identified above, or in the alternative, a harmonic party line ringing system such as disclosed in my copending application, Serial No. 301,215, which was filed on July 28, 1952, and is assigned to the same assignee as the present invention, without affecting the operation of the present invention.

*Substations A and B*

The substations respectively terminating the lines of the system may be identical to the same system components described in detail in the copending application, Serial No. 134,974, identified above. In this connection it will be understood that substations provided with harmonic ringing facilities may be employed in the event that a harmonic ringing system is to be used as described in detail in my copending application, Serial No. 301,215, identified above.

*Line circuits 10 and 16*

These two line circuits, as well as the line circuits terminating the other lines of the system, may be identical in circuitry and mode of operation and may correspond to the same system components described in detail in any one of the copending applications, Serial No. 134,974, Serial No. 205,641, or Serial No. 257,712, identified above. However, it will be understood that a particular type of line circuit is designed to operate with a particular type of multiplexer so that the correct line circuit and multiplexer combination should be employed. In the illustrated embodiment of the present invention a line circuit of the type described in detail in copending application Serial No. 134,974, identified above, is illustrated.

*Multiplexer 11*

This circuit may be identical to the corresponding system component described in detail in either of the copending applications, Serial No. 134,974 and Serial No. 205,641, referred to above. However, in the illustrated embodiment of the present invention, a multiplexer of the type disclosed in copending application Serial No. 134,974 is employed.

*Finder 12a and buffer amplifier 190*

Figures 5, 6:
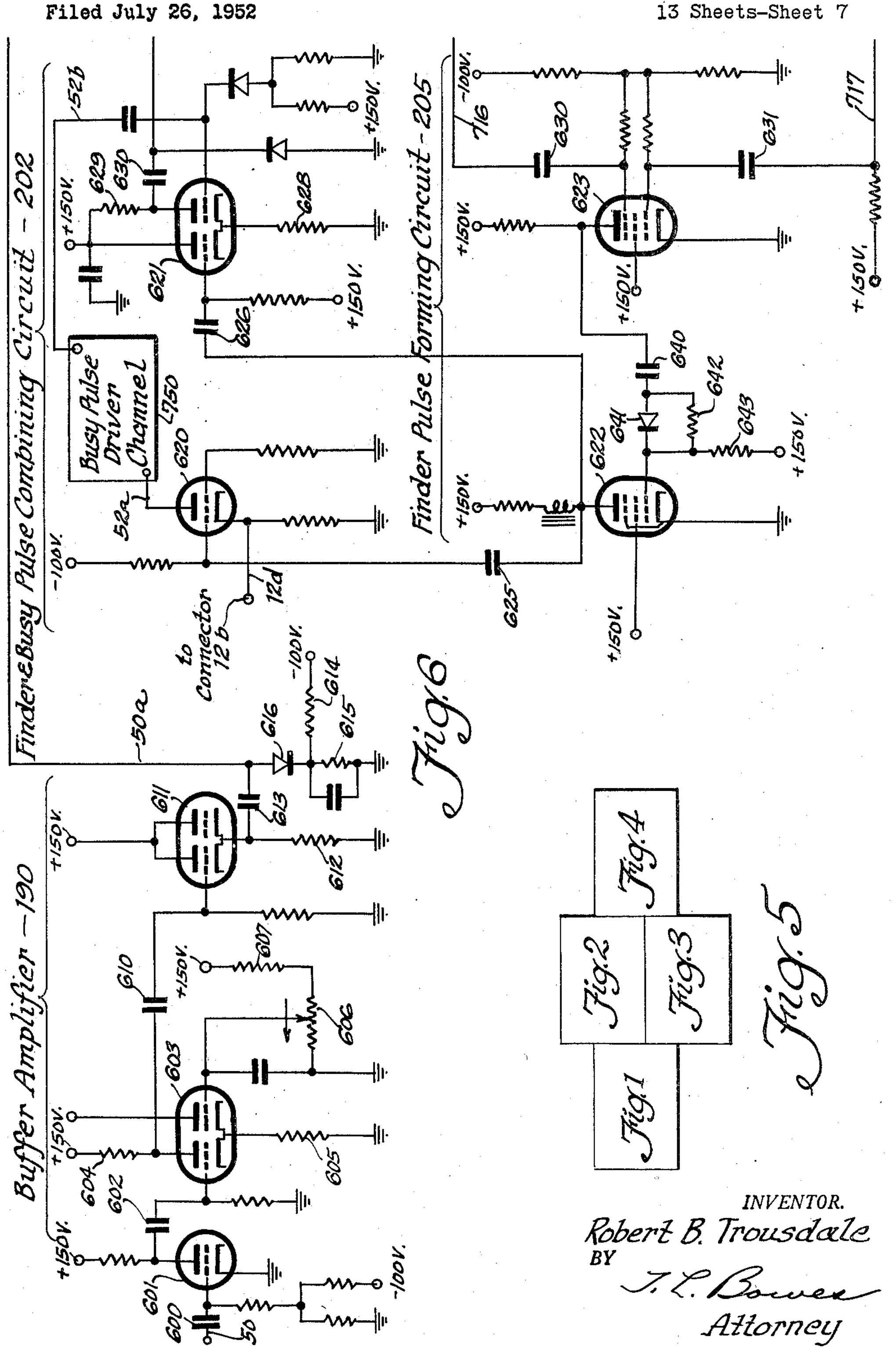
Figure 7:
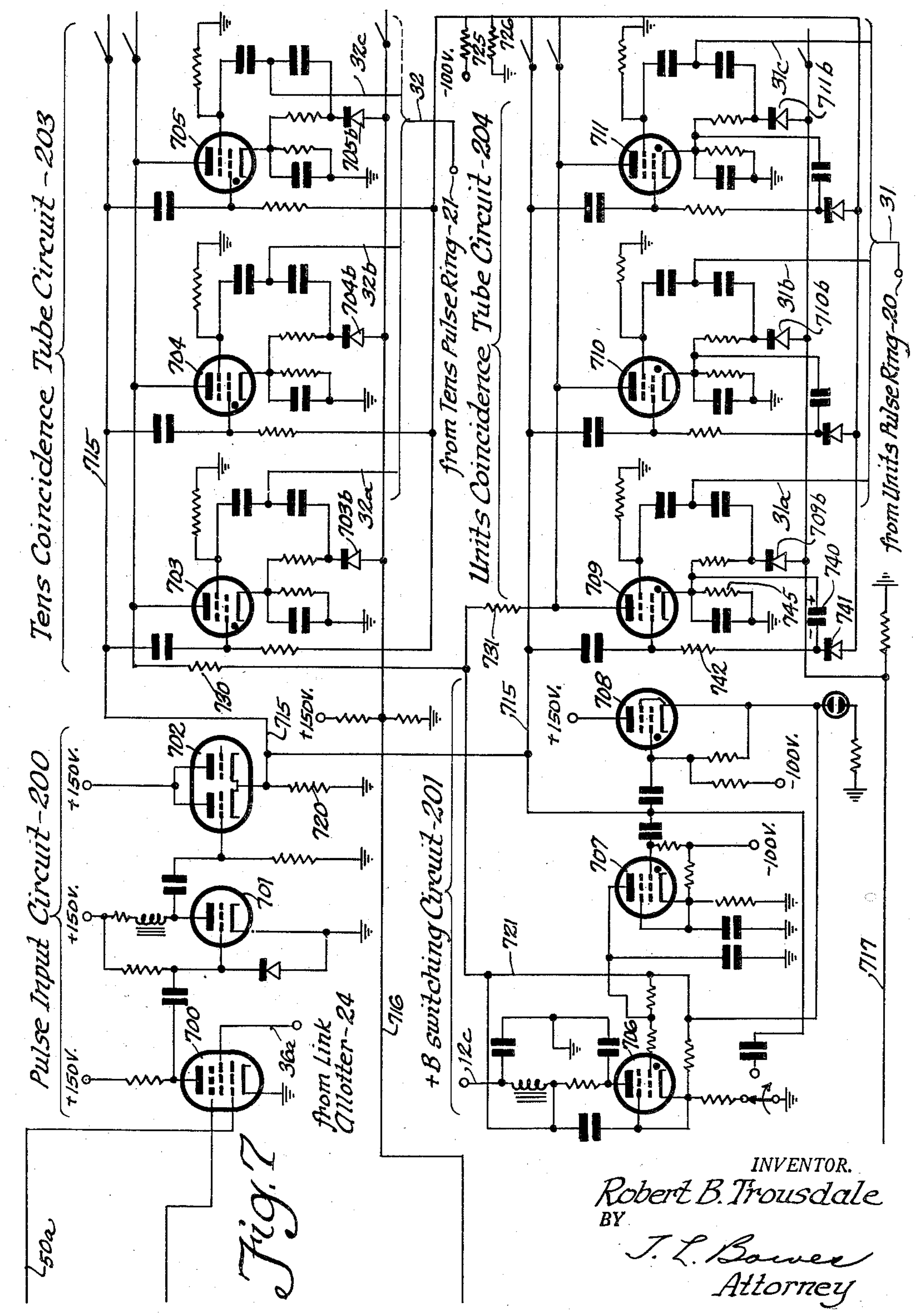

As generally explained heretofore the finders 12*a*, 13*a* and 14*a* of the system of the present invention are provided with novel facilities for preventing false identification of the calling line by the finder. Furthermore, the finders of the present invention are operated in conjunction with the buffer amplifier 190 to provide more positive and reliable control of the seized linkage in response to multiplexer pulses appearing in the time positions assigned to calling lines of the system. In Figs. 6 and 7 of the drawings there is shown in detail the schematic diagram of the buffer amplifier 190 and one embodiment of the finder 12*a*. In the embodiment of the finder 12*a* shown in Figs. 6 and 7, the false identification prevention facilities are provided in the tens and units coincidence tube circuits 202 and 203. Also in Figs. 8 and 8A of the drawings, there is shown alternative embodiments of the finder 12*a* wherein separate identification facilities are provided for the purpose of preventing false identification of the calling line.

Considering first the operation of the buffer amplifier 190, it will be recalled that this circuit component is provided for the purpose of isolating the relatively narrow (one-fifth microsecond) multiplexer pulses, delivered by the multiplexer 11 to the connectors 12*b*, 13*b* and 14*b* of the system, from the line finders 12*a*, 13*a*, and 14*a* of the system, and to provide for positive and reliable association of the line finder with the calling line through the multiplexer 11. The buffer amplifier 190 also reduces the load upon the multiplexer output circuit so that a relatively large number of connectors may be serviced by one multiplexer without producing cross talk or distortion of the multiplexer signal output pulses.

Referring now to Fig. 6 of the drawings, the relatively narrow multiplexer signal pulses, which are impressed upon the conductor 50 from the output circuit of the multiplexer 11, are coupled through the condenser 600 to the control grid of an inverter tube 601. In this connection it will be recalled that the multiplexer signal pulses are modulated in amplitude in accordance with voice and supervisory signals transmitted over the calling line. However, as discussed generally heretofore, the modulation components of these pulses are not required for seizure of the line finder and, in fact, a relatively large amplitude pulse of constant amplitude is preferable for establishing operative association of the line finder with the calling line. Accordingly, the control grid of the inverter tube 601 is biased somewhat beyond cutoff so that the positive multiplexer pulses appearing on the conductor 50 drive the control grid of the inverter tube 601 into the conductive region of this tube and preferably into the grid current region so that the pulses are first limited in the grid-cathode circuit of the tube 601. These multiplexer signal pulses appear as negative pulses of amplified form in the anode circuit of the tube 601 and are coupled through the condenser 602 to the control grid of the lefthand section of a double triode tube 603, preferably of the commercial type 6J6.

The lefthand section of the tube 603 is employed as a variable gain amplifying stage and the righthand section of the tube 603 is employed as a variable gain control for the lefthand section of this tube. Thus, the negative pulses coupled through the condenser 602 to the control grid of the lefthand section of the tube 603 are inverted in this section and appear as positive pulses across the anode resistor 604 thereof. A common cathode resistor 605 is connected from the common cathode connection of the tube sections of the tube 603 to ground potential. The righthand section of the tube 603 is operated as a cathode follower and the tube current for this section flows through the common cathode resistor 605. The control grid potential of the righthand section of the tube 603 is varied by means of a potentiometer 606 which is connected through the resistor 607 to the positive +B supply potential. By variation of the arm of the potentiometer 606 the control grid potential and hence the tube current of the righthand section of the tube 603 may be varied so that effectively the cathode bias for the lefthand section of this tube is varied by adjustment of the potentiometer 606. At the same time, the righthand section of the tube 603 acts as a cathode driven cathode follower with an extremely low output impedance so that effectively the righthand section of the tube 603 acts as a cathode bypass condenser for the resistor 605. Also, the right hand section of the tube 603 acts as a variable gain control for the lefthand section thereof.

The amplified positive pulses appearing across the resistor 604 are coupled through the condenser 610 to the control grids of a double triode cathode follower output tube 611, preferably of the commercial type 6J6. These positive pulses are repeated across the common cathode resistor 612 of the tube 611 and are coupled through the condenser 613 to the conductor 50*a* over which conductor they are transmitted to the first control grid of the finder control gate tube 700 in the pulse input circuit 200 of the finder 12*a*. In order to provide the correct bias potential for the first control grid of the tube 700 there is provided the resistors 614 and 615 which are connected in series from the negative bias potential source to ground potential and a clamping rectifier 616 is connected from the conductor 50*a* to the junction point of the resistors 614 and 615 to clamp the base line of the pulses impressed upon the conductor 50*a* to the correct bias potential for the control grid of the tube 700.

Considering now the detailed circuitry of the embodiment of the finder 12*a* shown in Figs. 6 and 7 of the drawings, it will be seen that the pulse input circuit 200 comprises the finder control gate tube 700, an inverter tube 701 and a cathode follower output tube 702 which are connected in tandem in the order named and are arranged to impress pulse gated therethrough upon a common output conductor 715. These pulses are distributed over the conductor 715 to the input terminals of the tens coincidence tube circuit 203, the units coincidence tube circuit 204 and the +B switching circuit 201 in parallel. The +B switching circuit 201 comprises a +B switch tube 708, a +B switch timing tube 707, and a +B switch extinguishing tube 706 interconnected in the manner illustrated. This circuit is actuated under the control of pulses gated thereto by the pulse input circuit 200 over the conductor 715.

The tens coincidence tube circuit 203 comprises ten gate control tubes, the first, second and third of which are indicated at 703, 704, and 705 of the drawings (Fig. 7). These gate control tubes have individually associated therewith ten pulse gating rectifiers, i. e. 703*b*, 704*b* and 705*b*, and the gate control tubes are arranged to be jointly controlled by pulses delivered thereto from the pulse input circuit 200 over the conductor 715 and positive tens pulses successively transmitted thereto over the positive tens pulse conductors 32*a*, 32*b*–32*j* from the tens pulse ring circuit 21. The pulses gated by the tens coincidence tube circuit 203 are impressed upon finder pulse forming circuit 205 over a path which includes the conductor 716. Similarly, the units tube coincidence circuit 204 comprises ten gate control tubes of which the first, second and third tubes 709, 710, and 711 are illustrated in horizontal alignment in Fig. 7. These tubes have pulse gating crystal rectifiers 709*b*, 710*b* and 711*b* individually associated therewith and are arranged to be jointly controlled by pulses delivered thereto over the conductor 715 from the pulse input circuit 200 and positive units pulses successively transmitted thereto over the units pulse conductors 31*a*, 31*b*–31*j* from the units pulse ring circuit 20. Units pulses gated by the units coincidence tube circuit 204 are transmitted to the finder pulse forming circuit 205 over a path which includes the conductor 717.

The finder pulse forming circuit 205 comprises a pulse forming tube 623 and a pulse shaping and inverter tube 622 connected in tandem in the order named. As shown, the pulse forming circuit 205 is controlled solely by pulses gated thereto from the two coincidence tube circuits 203 and 204. Pulses developed at the output side of this circuit are impressed upon the pulse combining circuit 202 over two paths which respectively include the coupling condensers 625 and 626.

The pulse combining circuit 202 comprises a busy pulse and finder gate pulse output tube 620 and a pulse mixer tube 621, both of which tubes are arranged to be controlled by the finder pulse forming circuit 205. The tube 621 is also arranged to respond to busy pulses transmitted thereto over the busy pulse in conductor 52*b* from the busy pulse driver channel 750. In this connection it will be understood that the busy pulse driver channel 750 is substantially identical to the corresponding system component shown and described in detail in my copending application, Serial No. 257,712, referred to above. The finder and busy pulse combining circuit 202 functions to gate busy pulses over the busy pulse out conductor 52*a* when the finder 12*a* is operatively associated with a calling line to the busy pulse driver channel 750 wherein these busy pulses are repeated across a low impedance output circuit and supplied over the common busy pulse in conductor 52*b* to all of the finders and connectors of the system. The circuit 202 also functions to gate finder gate pulses to the conductor 12*b* when the finder 12*a* is operatively associated with a calling line. Circuit elements not specifically mentioned in the above description of the finder 12*a* are referred to below in describing the functions which they respectively perform in the line finder circuit. All gas filled tubes embodied in the finder 12*a*, namely the ten tubes of the ten coincidence tube circuit 203, the ten tubes of the units coincidence tube circuit 204, and the three tubes of the +B switching circuit 201 are highly sensitive thyratrons, preferably of the RCA commercial type 5696. The two dual triode tubes 621 and 702 are preferably of the commercial 6J6 type, the triodes 620 and 701 are preferably of the commercial 6C4 type, the pentode 622 is preferably of the commercial 6AU6 type and the pentodes 623 and 700 are preferably of the 6AS6 commercial type.

Operational details of the components of the finder 12*a* may best be explained with reference to the functions performed by this finder in handling the above described call originating in the substation A and routed to the substation B. In this regard it will be recalled from the above general description of the system that when the call is initiated on the line 23, multiplexer pulses appearing in the time position 64*b* assigned to the calling line 23 and modulated with signals derived from this line are transmitted from the multiplexer 11 over the conductor 50 and through the buffer amplifier 190. From the amplifier 190, these pulses, which may be called finder drive pulses at this point, are transmitted over the conductor 50*a* to the pulse input circuit 200 of each of the finders of the system. However, each of the finders is sequentially allotted to the use of calling lines of the system by means of the link allotter circuit 24 so that only one of the finders of the system is permitted to respond to the finder drive pulses impressed upon the conductor 50*a*. Normally, the first control grid of the finder control gate tube 700 is biased beyond cutoff by means of the above-described biasing network 614, 615 in the buffer-amplifier 190. However, when the positive finder drive pulses appearing on the conductor 52*a* coincide with the positive allotter pulses fed to the screen grid of the tube 700 over the conductor 36*a*, the tube 700 conducts and the finder drive pulses are repeated as negative pulses across the anode resistor of the tube 700. These pulses are amplified and inverted in the tube 701 and appear as positive pulses across the cathode resistor of the output tube 702. The positive finder drive pulses produced across the resistor 720 are transmitted over the conductor 715 to the tens coincidence tube circuit 203, the units coincidence tube circuit 204 and the +B switching circuit 201.

In the tens coincidence tube circuit 203, the positive finder drive pulses appearing on the conductor 715 are impressed upon the first control grids of the ten gate control tubes 703, 704, 705, etc., in parallel, these control grids being normally biased beyond cutoff by means of a common biasing network including the resistors 725 and 726. When operating anode potential is supplied to the anodes of the gate control tubes of the circuit 203, these tubes are conditioned to fire under the joint control of the positive tens pulses respectively delivered to these tubes over the conductors 32*a*, 32*b*–32*j*, and the finder drive pulses delivered to these tubes over the conductor 715 from the pulse input circuit 200. Accordingly, the pulses delivered in the time position 64*b* over the conductor 715 to the control grids of the tubes in the circuit 203 coact with the tens gate pulses which are positively applied to fire that tens coincidence tube which corresponds to the tens time position of the calling line in each pulse frame. In the illustrated call, the pulses developed on the conductor 715 in the time position 64*b* only occur in coincidence with the second tens pulse of each pulse frame so that only the second tens coincidence tube 704 is fired in the circuit 203.

In a similar manner the units coincidence tube circuit 204 is controlled by the positive units pulses delivered to this circuit and pulses gated to this circuit over the conductor 715 from the pulse input circuit 200 so that, in the illustrated call, the pulses developed on the conductor 715 in the time position 64*b* occur in coincidence only with the third units pulse of each units pulse cycle so that only the third units coincidence tube 711 is fired in the circuits 204. Once the indicated coincidence tubes in the circuits 203 and 204 are fired, the remaining tubes in each coincidence tube circuit are positively prevented from firing through the voltage drop across the common anode resistor 730 in the circuit 203 and the common anode resistor 731 in the circuit 204.

In considering the manner in which the tens coincidence tube circuit 203 and the units coincidence tube circuit 204 coact to establish the identity of the calling line, i. e. the time position assigned to the calling line, it will be recalled that the pulse input circuit 200 will pass finder drive pulses appearing in more than one time position until a particular calling line is identified at which time the finder control gate tube 700 is prevented from accepting any other finder drive pulses than those appearing in the selected calling line time position. Accordingly, if two or more lines of the system are calling at the same time, there may be impressed upon the conductor 715, in the output circuit of the pulse input circuit 200, positive pulses which appear in several time positions in each pulse frame. These pulses which represent several different lines, will compete for recognition in the tens coincidence tube circuit 203 and the units coincidence circuit 204. If we assume, for example, that both the line 32 and the line 23 are competing for recognition, it will be seen that either of the tens coincidence tubes 704 or 705 may be fired and likewise either of the tubes 710 or 711 in the units coincidence circuit 204 may be fired. Depending upon the individual sensitivities of these tubes and their associated circuits, the tube 705 in the tens coincidence circuit 203 may fire before the tube 704 in this circuit is fired even though the tube 705 is controlled by pulses which occur in a later time position, and a tens time position of "3" will be established by firing the tube 705. At the same time, in the units coincidence tube circuit 204 the tube 711 may be fired before the tube 710 of this circuit even though the tube 711 is controlled by pulses which occur in a later time position. Accordingly, a units time position of "3" may also be established so that the erroneous time position 33 is identified as a calling line by incorrectly combining information supplied by the respective calling lines 32 and 23. In this situation, the tens and units pulses gated by the tens coincidence tube circuit 203 and the units coincidence tube circuit 204 are combined to provide finder gate pulses which occur in the time position assigned to the line 33 and these pulses are employed to exclude pulses occurring in other time positions from being accepted by the pulse input circuit 200. Since no calling condition exists on the line 33, the finder will eventually release due to the fact that no signal pulses appear in the selected time position and the +B circuit 201 in the finder 12*a* is opened as a result. However, the finder 12*a* may continue to identify the calling line incorrectly and release in the manner described above so that in the absence of the line identification facilities provided in accordance with the present invention, the finder 12*a* may continue to seize and release until the simultaneous calling condition on the lines 23 and 32 ceases.

In order to prevent the false identification of a calling line under the circumstances described above, there is provided in conjunction with each of the coincidence tubes in the units coincidence tube circuit 204, a self-paralyzing circuit which makes it impossible for any one of the units coincidence tubes to be refired immediately. With this arrangement, the line 33 may be falsely identified the first time, but the inability of the units coincidence tube 711 to refire immediately forces recognition of the calling line 32 after the finder 12*a* has been released and responds again to multiplexer pulses.

Considering, for example the first coincidence tube stage in the units coincidence circuit 204, the above described self-paralysis circuit includes the condenser 740 and the rectifier 741 which are connected in series from the cathode of the tube 709 to the junction point of the resistors 725 and 726. The junction point of the anode of the rectifier 741 and the condenser 740 is also connected to the bottom end of the grid resistor 742 connected to the control grid of the coincidence tube 709. During idle periods the condenser 740 is charged to the potential of the bias voltage supplied to this condenser through the rectifier 741, this bias potential being impressed upon the control grid resistor 742 of the tube 709. When the tube 709 is fired under the above-described joint control of pulses impressed upon the conductor 715 and units pulses impressed upon the conductor 31*a*, a positive potential is produced across the cathode resistor 745 of the tube 709. The condenser 740 therefore becomes charged to a greater potential, i. e. the sum of the potential produced across the resistor 745 and the normal potential to which the condenser 740 is charged so that a relatively large negative potential is produced across the condenser 740 in the polarity shown in Fig. 7 of the drawings. When the tube 709 is extinguished by release of the +B switching circuit 201 when no calling line is found in an erroneously selected time position, the voltage across the cathode resistor 745 disappears so that the reference point for the condenser 740 is shifted from a positive potential with respect to ground to ground potential. Effectively, therefore, the grid bias potential on the tube 709 is increased so that this tube is rendered less sensitive to the pulses impressed upon the conductor 715. The increased charge across the condenser 740 gradually leaks off through the back resistance of the crystal 741 and during this period the tube 709 is rendered less sensitive than the remaining tubes of the units coincidence tube circuit 204. Accordingly, on the second try, the correct calling line is identified due to the fact that the units coincidence tube which is erroneously fired on the first try is rendered incapable thereafter of firing for an interval of time sufficient to permit the correct tube to be fired in the circuit 204. In this connection it will be understood that a self-paralysis circuit of the type described above may be employed with the coincidence tubes in the tens coincidence tube circuit 203 and the above described operation will be obtained. Under such conditions the erroneously fired tens coincidence tube is paralyzed, i. e., rendered less sensitive than the remaining tubes in the tens coincidence tube circuit 203 so that on the second try the correct tens tube is fired and the correct calling line is identified. It will also be understood that self-paralyzing circuits of the type described above may be employed with each tube in both of the tens and units coincidence tube circuits, although such revision is not normally required to effect the correct identification of the calling line.

Referring now more particularly to the manner in which the finder pulse forming circuit 205 responds to the positive tens and units pulses gated thereto from the circuits 203 and 204, it is pointed out that normally both the first control grid and suppressor grid of the tube 623 are biased negatively so as to prevent current flow through this tube. The tens pulses impressed upon the conductor 716 are coupled through the condenser 630 to the suppressor grid of the tube 623 and the units pulses impressed upon the conductor 717 are coupled through the condenser 631 to the first control grid of the tube 623. Since both the control grid and suppressor grid of the tube 623 are biased beyond cutoff, the tube 623 is only rendered conductive upon the simultaneous occurrence of a tens pulse impressed upon the suppressor grid thereof and a units pulse impressed upon the first control grid thereof. Accordingly, in the anode circuit of the tube 623 there is developed only a single units pulse corresponding to the selected calling line time position. In the illustrated call, the units pulses 64*b*, which occur during the second tens time position 73*a*, are selected and appear at the anode circuit of the tube 623. By providing the above-described positive tens and units pulse combining circuit, the gating action of the tube 623 is completely performed within this tube and a single pulse appearing in the calling line time position is produced in the output circuit of this tube.

In order to remove any base line hash or noise disturbances which may be produced at the anode of the tube 623, there is provided a pulse clipping circuit which is employed to couple the negative pulses produced at the anode of the tube 623 to the control grid of the inverter tube 622. This pulse clipping circuit includes the condenser 640, the rectifier 641, and the resistors 642 and 643 which cooperate to clip the baseline of the negative pulses produced at the anode of the tube 623 and a clean negative pulse wavetrain is applied to the control grid of the inverter tube 622. These negative pulses are amplified and inverted in the tube 622 and the positive pulses appearing at the anode of the tube 622 may be called finder pulses which occur in the time position assigned to the calling line.

The finder pulses developed at the anode of the tube 622 in the manner just explained are impressed upon the control grid of the output tube 620 through the coupling condenser 625. In order to provide finder gate pulses which serve to condition the connector associated therewith to respond only to multiplexer pulses appearing on the multiplexer output conductor 50 in the time position assigned to the calling line 23, the cathode circuit of the tube 620 is employed as the sole source of such pulses and these pulses are transmitted over the conductor 12*d* as finder gate pulses to the connector 12*b*. Also, the anode of the tube 620 is connected over the conductor 52*a* to a common anode resistor in the busy pulse driver channel 750 so that the finder pulses impressed upon the control grid of the tube 620 are transmitted over the conductor 52*a* as negative busy pulses, and these pulses are repeated through the busy pulse driver channel 750 and appear as positive pulses on the output conductor 52*b* thereof. The busy pulses which are amplified in the busy pulse driver channel 750 are transmitted over the conductor 52*b* to the right-hand control grid of the pulse mixer tube 621 along with any other busy pulses applied to this conductor as a result of other lines of the system being busy.

To prevent the busy pulses which are impressed upon the right control grid of the tube 621 in the time position 64*b* from biasing the suppressor grid of the finder gate control tube 700 beyond cutoff, the lefthand section of the tube 621 is supplied with positive finder pulses which are impressed upon the left control grid of this tube through the coupling condenser 626. These finder pulses are approximately twice the amplitude of the busy pulses coincidentally impressed upon the right control grid of this tube so that heavy space current flow through the left section of the tube 621 and the common cathode resistor 628 occurs during each finder pulse interval. Thus, during each finder pulse interval, the bias on the right section of the tube 621 is increased to such an extent that current flow through the anode resistor 629 thereof drops to a very low value. As a consequence, the condenser 630 is charged to a relatively high voltage level during each finder pulse interval and at the end of each such interval the voltage across the condenser 630 is negatively applied to the suppressor grid of the gate tube 700 and biases this grid beyond cutoff. As a consequence, the tube 700 is biased beyond cutoff by the voltage across the condenser 630 throughout each pulse frame except for the particular interval spanned by the time position 64*b*. During this interval the right anode of the tube 621 becomes highly positive to overcome the voltage across the condenser 630 and renders the tube 700 conductive. It will therefore be understood that pulses from the multiplexer 11, which are amplified in the buffer amplifier 190 and appear as finder drive pulses on the conductor 50*a*, are permitted to enter the finder 12*a* only during those intervals when finder pulses are developed by the circuit 205 so that the finder control gate tube 700 is responsive only to finder drive pulses in the time position of the selected calling line.

Figures 8, 8A:
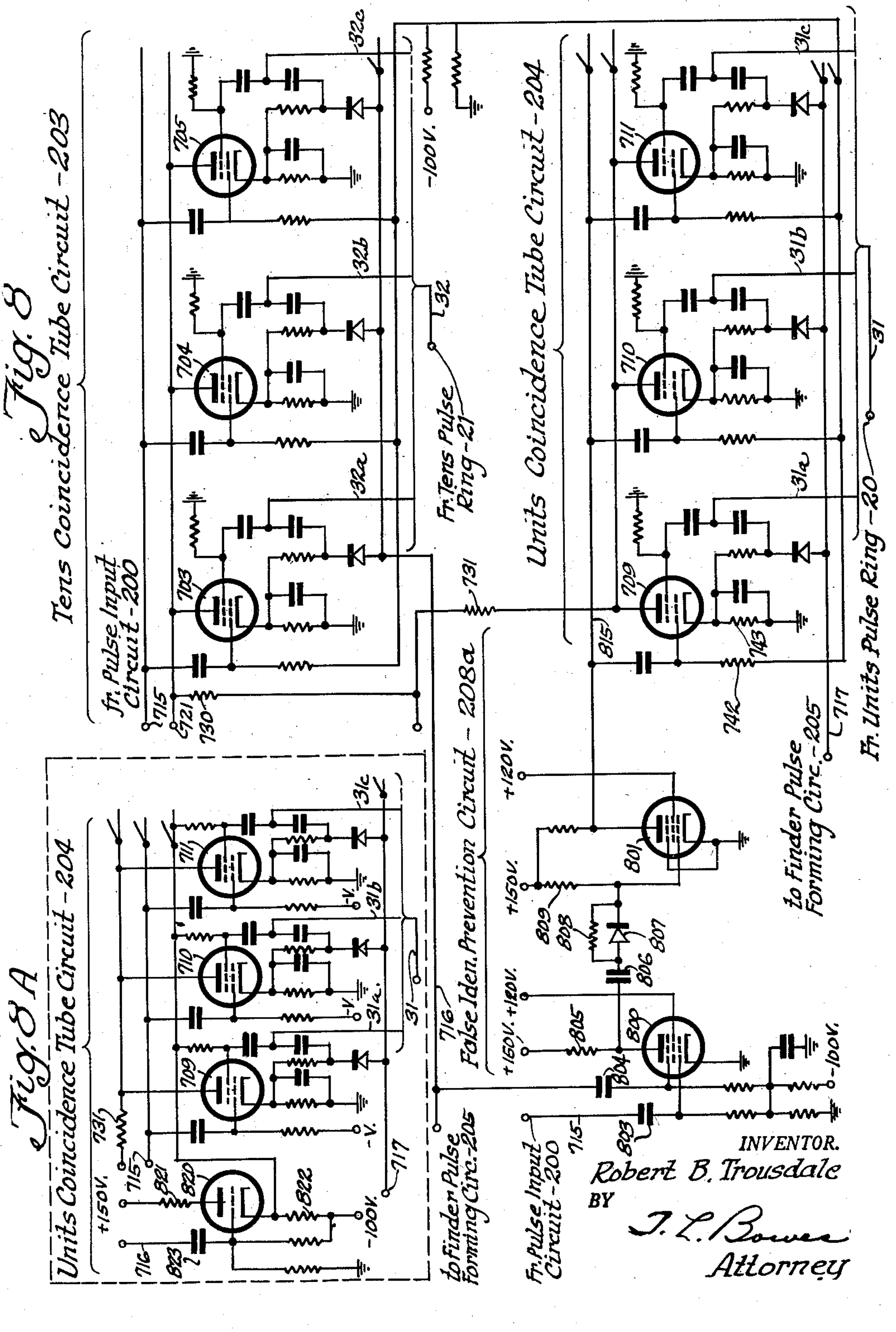
Fig. 8 is a schematic diagram of an alternative embodiment of the line finder of Fig. 2A.
Fig. 8A is a schematic diagram of another alternative embodiment of the line finder of Fig. 2A.
Figure 9:
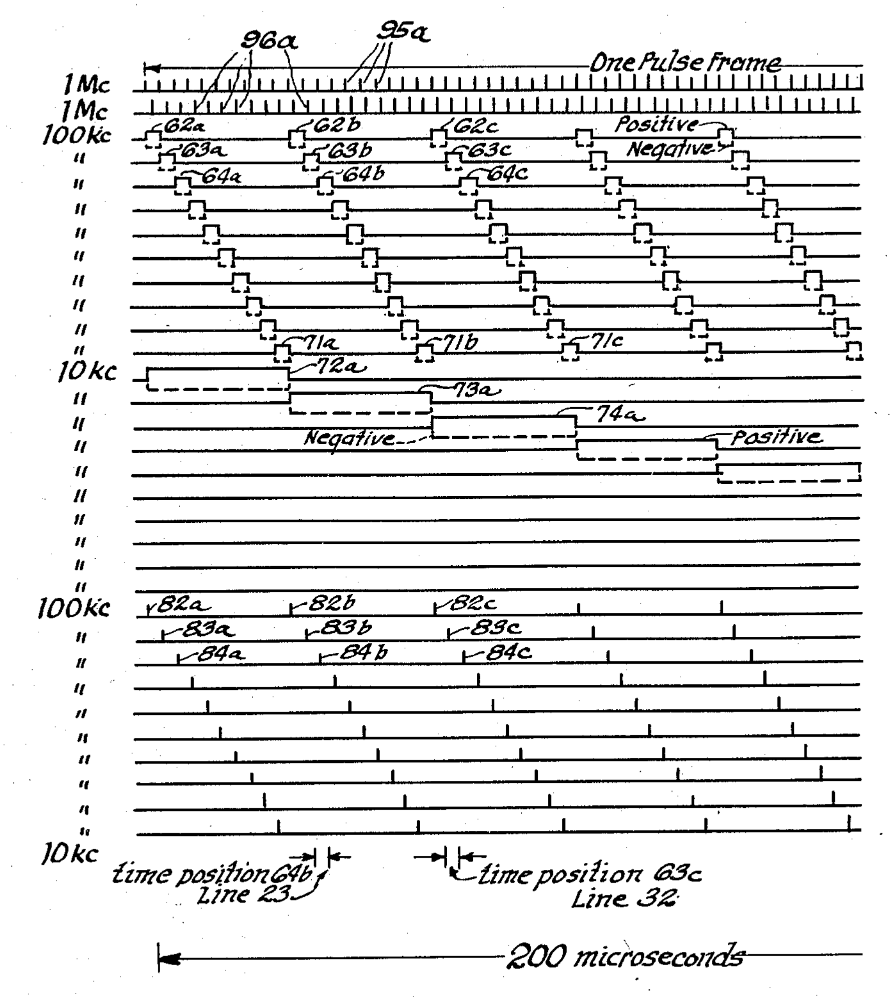
Figs. 9 to 12, inclusive, when laid side by side in the order named, graphically illustrate the time relationships between certain of the pulses developed by and utilized in the various components of the system.
Figure 10:
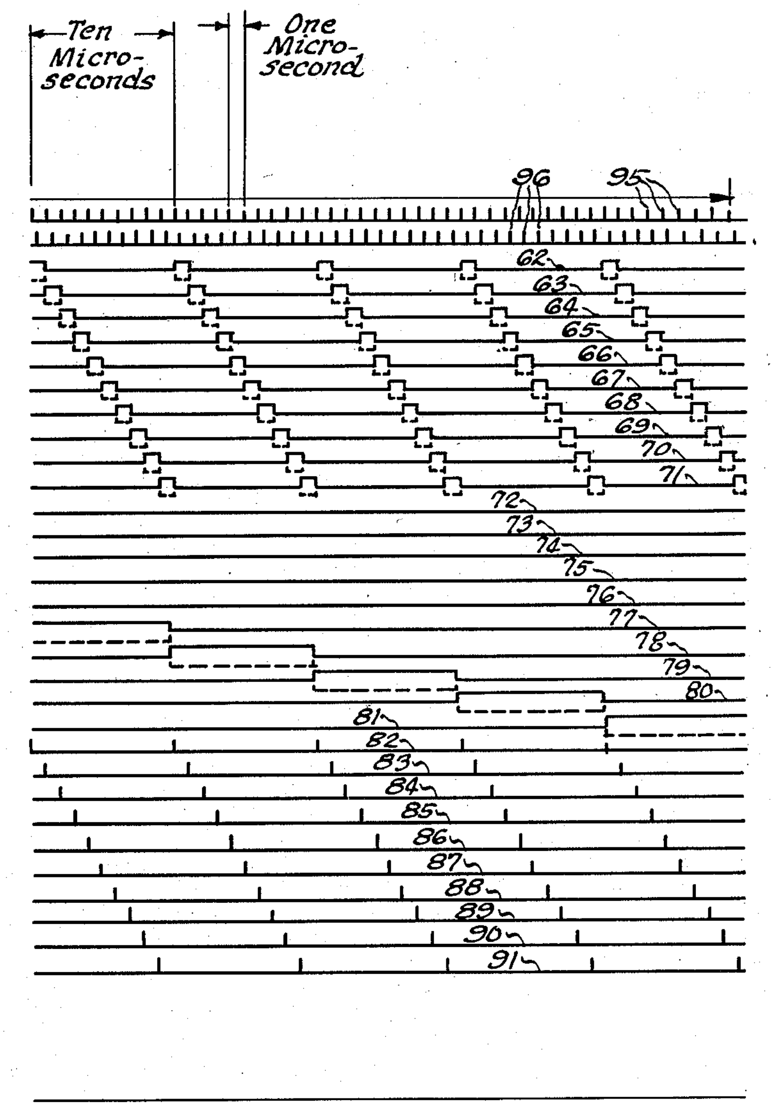
Figure 11:
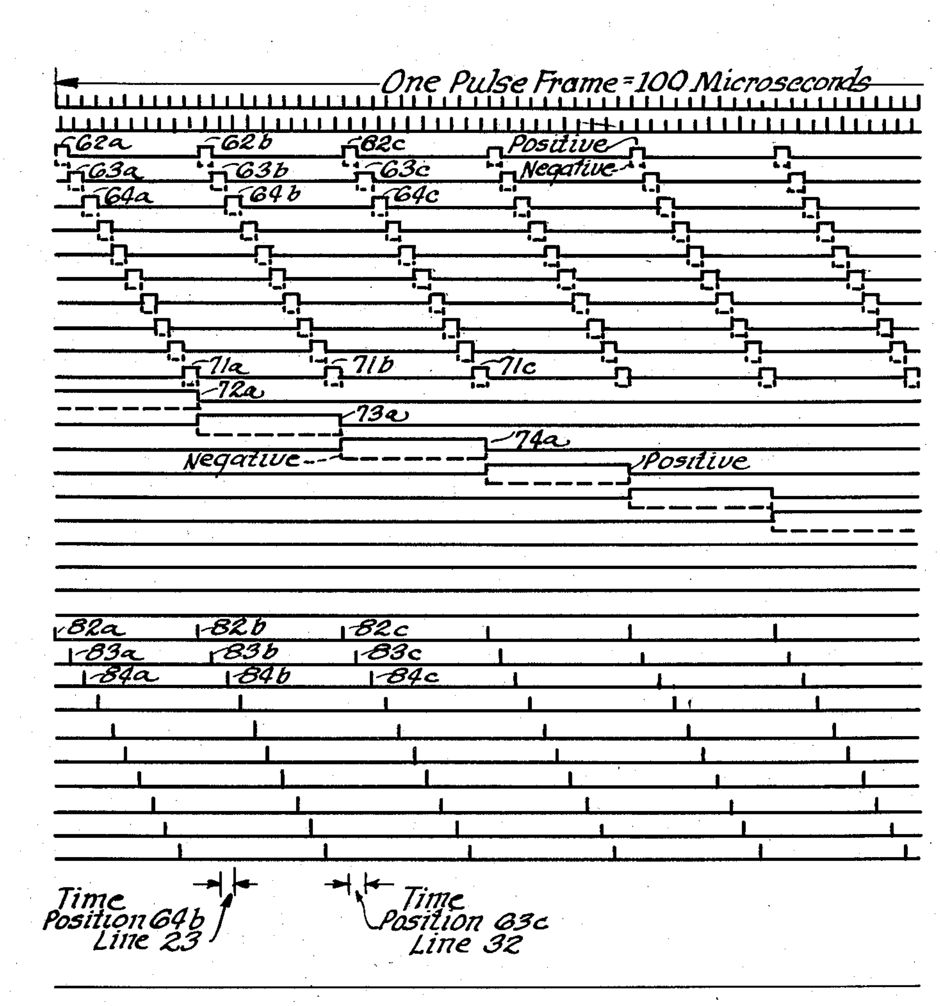
Figure 12:
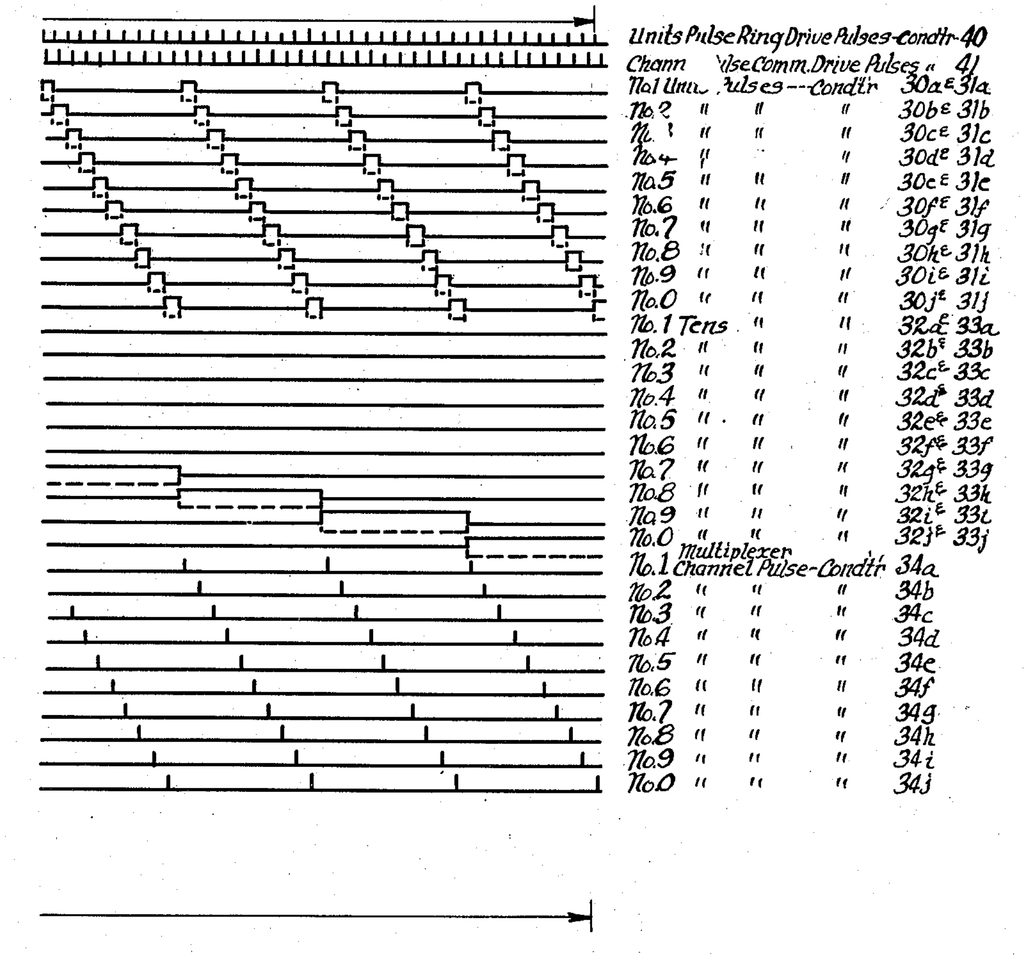

In order to avoid completely the false identification of calling lines, there is provided in the alternative embodiment of the finder 12*a* shown in Fig. 8 of the drawings, a false identification prevention circuit 208 which may be employed in place of the self-paralyzing circuits described in detail above and operates to force the line finder 12*a* to identify the calling line correctly. In the alternative embodiment of the finder 12*a* shown in Fig. 8 of the drawings, the same reference numerals have been employed for the corresponding circuit components described in detail above in connection with the finder 12*a* shown in Figs. 6 and 7 of the drawings. Moreover, only that portion of the finder which is directly concerned with the false identification prevention circuit 208 is shown in detail in Fig. 8.

Considering now the operation of the alternative embodiment of the finder 12*a* shown in Fig. 8 of the drawings, the positive finder drive pulses which are repeated through the pulse input circuit 200 are developed on the conductor 715 and are repeated to the tens coincidence tube circuit 203 in a manner identical to that described above in connection with the embodiment shown in Figs. 6 and 7 of the drawings. However, the positive pulses appearing on the conductor 715 are not supplied directly to the units coincidence tube circuit 204 but instead are supplied to the false identification prevention circuit 208*a*. Upon receipt of the positive pulses appearing on the conductor 715 the tens coincidence tube circuit 203 responds thereto by firing that particular control tube which is supplied with tens pulses appearing in the tens pulse time position which corresponds to the pulses appearing on the conductor 715. Thus, in the illustrated call from the line 23, the tube 704 will be fired by coincidence of the pulses appearing on the conductor 715 and the tens pulses impressed upon the shield grid of this tube over the conductor 32b. In this connection, it will be understood that if several lines are calling at the same time, corresponding pulses will be produced on the conductor 715 and any one of the control tubes in the coincidence tube circuit 203 may be fired in response to these pulses depending upon the individual sensitivities of the control tubes. However, it will be understood from the foregoing description that when one of the control tubes of the circuit 203 is fired the remaining tubes are positively prevented from firing by means of the above described common anode resistor 730.

When one of the tubes in the coincidence tube circuit 203 is fired in response to the pulses appearing on the conductor 715, the associated gating rectifier is opened so as to admit tens pulses appearing in the selected tens pulse time position to the conductor 716 and the tens pulses produced on this conductor are supplied to the finder pulse forming circuit 205 in a manner identical to that described above. However, in accordance with the alternative embodiment shown in Fig. 8 these tens pulses are also supplied to the false identification prevention circuit 208a. The circuit 208a responds to the pulses gated thereto from the conductor 715 and the tens pulses gated thereto from the conductor 716 by selecting the particular finder drive pulse which occurs during the selected tens pulse time position. Accordingly, if several calling lines are competing for the line finder 12a and these lines occur in different tens digit levels, only that particular finder drive pulse which corresponds to the selected tens pulse time position set up by the tens coincidence tube circuit 203 is permitted to pass through the false identification prevention circuit 208a. The selected finder drive pulse passed by the circuit 208a is then impressed upon the first control grids of all of the tubes in the units coincidence tube circuit 204 so as to excite these tubes in a manner substantially identical to that described above in connection with the alternative embodiment shown in Figs. 6 and 7 of the drawings. However, by allowing only those finder drive pulses which occur during the selected tens pulse time position to be presented to the units coincidence tube circuit 204 the false identification of a calling line is positively prevented.

Thus, for example, consider the situation wherein the calling lines 32 and 23 are competing for recognition in the finder 12a. Assuming that the third tube 705 is fired in the tens coincidence tube circuit 203, tens pulses appearing in the third tens pulse interval 74a (Figs. 9 to 12, inclusive) will be gated to the conductor 716 and supplied to the false identification prevention circuit 208a. The circuit 208a responds to these tens pulses by allowing only the finder drive pulses corresponding to the line 32 to pass therethrough so that the units coincidence tube circuit 204 receives only the finder drive pulses corresponding to the line 32, the finder drive pulses corresponding to the line 23 being unable to pass through the false identification prevention circuit 208a. It will therefore be seen that the false identification of a calling line is positively prevented by the above described sequential operation of the tens and units coincidence tube circuits 203 and 204 and the provision of the false identification prevention circuit 208a to prevent undesired finder drive pulses from being applied to the units coincidence tube circuit 204. In this connection it will also be understood that no false identification can occur by virtue of the occurrence of several finder drive pulses in the same tens pulse interval since the selection of any one of these pulses which would be impressed upon the units coincidence tube circuit 204 would result in the identification of a true calling line.

Considering now in more detail the circuitry of the false identification prevention circuit 208a, the finder drive pulses impressed upon the conductor 715 are coupled through the condenser 803 to the first control grid of a false identification gate tube 800, preferably of the commercial type 6AS6. Likewise, the tens pulses gated to the conductor 716 are coupled through the condenser 804 to the suppressor grid of the gate tube 800. Both the first control grid and the suppressor grid of the tube 800 are biased beyond cutoff so that the tube 800 is normally non-conductive. However, when the tens pulses impressed upon the suppressor grid of the tube 800 coincide with one or more of the finder drive pulses impressed upon the control grid of this tube, the tube 800 conducts so as to produce across the anode resistor 805 thereof negative finder drive pulses appearing in the selected tens pulse time position. The negative pulses produced at the anode of the tube 800 are coupled through a pulse clipping circuit including the condensor 806, the rectifier 807, and the resistors 808 and 809 to the control grid of a pentode inverter tube 801 preferably of the commercial type 6AK6. This pulse clipping circuit is identical to the pulse clipping circuit described above in connection with the finder pulse forming circuit 205 shown in Fig. 6 of the drawings, and is employed to remove any base line hash which may be present on the base line of the negative pulse wavetrain produced at the anode of the tube 800. The clipped negative pulses impressed upon the control grid of the inverter tube 801 are inverted in this tube and appear in amplified form as positive pulses which are transmitted over the conductor 815 to the control grids of the control tubes in the units coincidence tube circuit 204 in parallel. As described above, the units coincidence tube circuit 204 responds to these positive pulses produced on the conductor 815 by opening the particular gating rectifier corresponding to one of these pulses and the resulting units pulses gated to the conductor 717 are supplied to the finder pulse forming circuit 205. The finder pulse forming circuit 205 and the finder and busy pulse combining circuit 202 cooperate in the manner described above to supply finder gate pulses and busy pulses to the connector 12b in the time position assigned to a true calling line. Also, the +B switching circuit 201 operates in a manner identical to the previously described embodiment in supplying anode supply potential to the tens and units coincidence tube circuits 203 and 204.

In Fig. 8A of the drawings there is shown another alternative embodiment of the finder 12a wherein the units coincidence tube circuit 204 is so controlled that it cannot operate until after the tens coincidence tube circuit 203 has selected a particular tens pulse interval. Thus, referring to this figure, the units coincidence tube circuit 204 of this alternative embodiment is shown therein and corresponding reference numerals have been applied to the elements of this circuit which correspond with those of the circuits shown in Figs. 7 and 8. In the alternative embodiment of Fig. 8A, the finder drive pulses are applied from the conductor 715 to the first control grids of each of the coincidence tubes in the units coincidence tube circuit 204 in parallel. However, in order to prevent the units coincidence tube circuit 204 from responding to finder drive pulses in more than one tens pulse time position, the shield grid of each of the tubes 709, 710, 711, etc. thereof, is connected to the cathode of a sequencing tube 820, preferably of the commercial type 6C4. The anode of the tube 820 is connected to the positive supply potential through the resistor 821 and the cathode of this tube is connected through the resistor 822 to the negative bias potential supply. The control grid of the tube 820 is normally operated at a negative potential so that the cathode potential of the tube 820 is sufficiently negative to bias the shield grids of each of the coincidence tubes 709, 710, 711, etc. beyond cutoff and to prevent these tubes from firing in response to finder drive pulses impressed upon the control grids of these tubes from the conductor 715. Accordingly, until the tens coincidence tube circuit 203 has fired to develop tens pulses on the conductor 716, the sequencing tube 820 operates to prevent any coincidence tube in the units coincidence tube circuit 204 from firing. However, when a particular tube in the coincidence tube circuit 203 fires and tens pulses are produced on the conductor 716, these pulses are coupled through the condenser 823 to the control grid of the sequencing tube 820 and are repeated across the cathode resistor 822 of this tube. As a result, the shield grids of all of the coincidence tubes in the units coincidence tube circuit 204 are pulsed positively during the tens pulse interval which is selected by the tens coincidence tube circuit 203. It is therefore possible for any one of the tubes in the units coincidence tube circuit 204 to fire during this selected tens pulse interval under the control of the finder drive pulses impressed upon the control grids of these tubes from the conductor 715. With this arrangement the units coincidence tube circuit 204 is forced to identify the units time position of a calling line which has been selected on a tens digit basis by the tens coincidence tube circuit 203. In this connection it will be understood that either one of the alternative embodiments shown in Figs. 8 and 8A may be employed to effect a sequencing of the tens and units coincidence tube circuit 203 and 204 so that false identification of the calling line is positively prevented.

*Connector 12b*

This circuit may be identical to the corresponding system component shown and described in my copending application Serial No. 134,974, identified above, and reference may be had to this application for a complete and detailed description of the operation of this connector. In the alternative, a connector such as shown and described in detail in either one of my copending applications, Serial No. 257,712, or Serial No. 301,215, identified above, may be employed in the system of the present invention. However, it will be understood that certain changes in the common equipment 17 are required to provide for the correct operation of connectors of the particular type shown in these applications, as described in detail therein.

*Distributor 15*

This circuit may be identical to the corresponding system component described in detail in the copending application Serial No. 134,974, identified above, and reference may be had to this application for a complete and detailed description of this component. In the alternative, a distributor of the type described in detail in my copending application Serial No. 205,641, filed on January 12, 1951, and assigned to the same assignee as the present invention, may also be employed insofar as the present invention is concerned. However, it will be understood that a particular type of distributor is designed to operate with a particular type of line circuit. Thus, it is necessary to use complimentary line circuit and distributor combinations as described in detail in the above-identified copending applications.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. In an automatic telephone system, a plurality of lines having individually assigned thereto different time positions in repetitive time position frames, a finder-selector link including a finder and a selector, a first pulse path common to said lines and extending to said finder, a second pulse path common to said lines and extending to said selector, pulse generating means common to said lines for developing relatively narrow signal sampling pulses and relatively wide signal sampling pulse gating pulses in each of said time positions, multiplexer means controlled in part by said pulse generating means and responsive to the initiation of a call on one of said lines for transmitting narrow signal bearing multiplexer pulses derived from said pulse generating means over both said pulse paths in the time position assigned to the calling line, and buffer amplifier means included in said first path for isolating said finder from said multiplexer means.

2. In an automatic telephone system, a plurality of lines having individually assigned thereto different time positions in repetitive time position frames, a finder-selector link including a finder and a selector, a first pulse path common to said lines and extending to said finder, a second pulse path common to said lines and extending to said selector, pulse generating means common to said lines for developing relatively narrow signal sampling pulses and relatively wide signal sampling pulse gating pulses in each of said time positions, multiplexer means controlled in part by said pulse generating means and responsive to the initiation of a call on one of said lines for transmitting narrow signal bearing multiplexer pulses derived from said pulse generating means over both said pulse paths in the time position assigned to the calling line, buffer amplifier means included in said first path for isolating said finder from said multiplexer means, and means included in said buffer amplifier means for varying the amplitude of multiplexer pulses transmitted to said finder over said first path.

3. In an automatic telephone system, a plurality of lines having individually assigned thereto different time positions in repetitive time position frames, a finder-selector link including a finder and a selector, a first pulse path common to said lines and extending to said finder, a second pulse path common to said lines and extending to said selector, pulse generating means common to said lines for developing relatively narrow signal sampling pulses and relatively wide signal sampling pulse gating pulses in each of said time positions, multiplexer means controlled in part by said pulse generating means and responsive to the initiation of a call on one of said lines for transmitting narrow signal bearing multiplexer pulses derived from said pulse generating means over both said pulse paths in the time position assigned to the calling line, a finder gate pulse channel extending from said finder to said selector, means in said finder and responsive to multiplexer pulses transmitted to said finder over said first path for impressing relatively wide finder gate pulses derived from said pulse generating means on said finder gate pulse channel in the time position assigned to the calling line, and pulse gating means in said selector responsive to said finder gate pulses for admitting multiplexer pulses on said second pulse path to said selector in the time position assigned to the calling line.

4. In an automatic telephone system, a plurality of lines having different plural digit numbers individually assigned thereto, a plurality of directively controllable line selecting links common to said lines, means including said links for concurrently setting up connections between different pairs of said lines, coincidence circuit means included in each of said links for operatively associating the link with any calling one of said lines, and means included in each of said links and operative in the event a calling condition exists concurrently on several of said lines for preventing said coincidence circuit means from responding falsely to a digital combination of two of said concurrently calling lines incident to the setting up of said connections.

5. In an automatic telephone system, a plurality of lines having individually assigned thereto different time positions in repetitive time position frames, a line finder including a string of normally unactuated pulse type coincidence circuits, pulse generating means for successively supplying said circuits with pulses each spanning at least one time position of each time position frame, means for supplying exciting pulses to all of said circuits in parallel in the time positions assigned to calling ones of said lines, one of said circuits being actuated in response to coincidental excitation by a pulse gated by said last named means and a pulse developed by said pulse generating means, means in said finder controlled in part by actuation of said one circuit for operatively associating said finder with a calling line, and means in said finder and operative when said finder is released and said one circuit is restored to its normal condition for preventing said one circuit from immediately responding to said coincidental pulse excitation.

6. In an automatic telephone system, a plurality of lines having individually assigned thereto different time positions in repetitive time position frames, a line finder including a string of normally unactuated pulse type coincidence circuits, pulse generating means for successively supplying said circuits with pulses each spanning at least one time position of each time position frame, means for supplying exciting pulses to all of said circuits in parallel in the time position assigned to calling ones of said lines, one of said circuits being actuated in response to coincidental excitation by a pulse gated by said last named means and a pulse developed by said pulse generating means, means in said finder controlled in part by actuation of said one circuit for operatively associating said finder with a calling line, and means individual to each of said circuits for preventing each of said circuits from being twice fired in rapid succession in response to said coincidental pulse excitation.

7. In an automatic telephone system, a plurality of lines having individually assigned thereto different time positions in repetitive time position frames, a line finder including a string of electric discharge tubes, means for successively impressing on a first control grid of said tubes pulses which span at least one time position of each time position frame, means for gating to a second control grid of said tubes in parallel pulses which occur in the time positions assigned to calling ones of said lines, one of said tubes being fired in response to coincidental excitation by pulses gated to the first and second control grids thereof, means in said finder controlled in part by said one tube for selecting a calling line, and means responsive to firing of said one tube for biasing one of the control grids thereof beyond cutoff to prevent said one tube from being immediately refired in response to said coincidental pulse excitation.

8. In an automatic telephone system, a plurality of lines having individually assigned thereto different time positions in repetitive time position frames, a line finder including a string of electric discharge tubes of the gaseous discharge type, pulse generating means for successively impressing pulses which span at least one time position of each time position frame on a first control grid of said tubes, means for gating pulses which occur in the time positions assigned to calling ones of said lines to a second control grid of said tubes in parallel, one of said tubes being fired in response to coincidental excitation by a pulse gated by said last named means and a pulse generated by said pulse generating means, and means responsive to firing of said one tube and operative when said one tube is extinguished for thereafter rendering said one tube less sensitive to pulses gated thereto by said pulse gating means.

9. In an automatic telephone system, a plurality of lines having individually assigned thereto different time positions in repetitive time position frames, a line finder including a string of electric discharge tubes of the gaseous discharge type, pulse generating means for successively generating pulses which span at least one time position of each time position frame and impressing the same on a first control grid of said tubes, means for gating pulses which occur in the time positions assigned to calling ones of said lines to a second control grid of said tubes in parallel, one of said tubes being fired in response to coincidental excitation by a pulse gated by said last named means and a pulse generated by said pulse generating means, pulse gating rectifiers individually controlled by said tubes and operative to gate different pulses generated by said pulse generating means when the controlling tube is fired, means responsive to firing of said one tube for rendering the associated gating rectifier conductive, means operative in the event the pulses gated by said conductive rectifier do not coincide with pulses gated by said pulse gating means for extinguishing said one tube, and means responsive to the sequential firing and extinguishing of said one tube for rendering said one tube less sensitive to pulses gated by said pulse gating means.

10. In an automatic telephone system, a plurality of lines having individually assigned thereto different time positions in repetitive time position frames, a line finder including first and second coincidence circuit means each including a string of electric discharge tubes of the gaseous discharge type, means for sequentially transmitting units pulses to the tubes in one of said strings in each of said time positions, means for sequentially transmitting group pulses each of which spans a group of said units pulses to the tubes in the other of said strings, means responsive to the initiation of a call on any one of said lines for transmitting calling line pulses in the time positions assigned to calling ones of said lines to the tubes in both said strings in parallel, one of the tubes in said other string being fired in response to coincidental occurrence of the group pulses and calling line pulses transmitted thereto and one of the tubes in said one string being fired in response to coincidental occurrence of the units and calling line pulses transmitted thereto, means for combining the group and units pulses gated by said one tube in each of said strings to provide finder pulses which occur in the time position assigned to one of said lines, means operative in the event said finder pulses do not coincide with said calling line pulses for extinguishing the tubes in both of said strings, and means individual to each of the tubes in said one string for preventing the tube from being fired twice in succession in response to the same coincidental occurrence of calling line and units pulses transmitted thereto.

11. In an automatic telephone system, a plurality of lines having individually assigned thereto different time positions in repetitive time position frames, a line finder including a string of electric discharge tubes of the gaseous discharge type, pulse generating means for successively generating pulses which span at least one time position of each time position frame and impressing the same on a first control grid of said tubes, means for gating pulses which occur in the time positions assigned to calling ones of said lines to a second control grid of said tubes in parallel, a plurality of pulse gating rectifiers one for each of said tubes, means connecting one electrode of said rectifiers in parallel to a common output circuit, means individual to each of said rectifiers for impressing different pulses generated by said pulse generating means on the other electrode thereof, means individual to said tubes for rendering the gating rectifier associated therewith conductive in response to firing thereof, thereby to gate to said output circuit the pulses impressed upon said one gating rectifier, a clamping rectifier for each of said tubes, said clamping rectifier having one electrode thereof connected to a negative bias potential source, a capacitor connected from the cathode of each of said tubes to the other electrode of the clamping rectifier associated therewith, and means individually connecting the other electrodes of said clamping rectifiers to the second control grid of the associated tube, one of said tubes being fired in response to coincidental excitation by a pulse gated to the second control grid thereof and a pulse impressed upon the first control grid thereof, thereby to gate to said output circuit pulses impressed upon the associated gating rectifier, the capacitor associated with said one tube being charged negatively in response to firing of said one tube, means operative in the event the pulses gated to said output circuit do not coincide with pulses gated by said pulse gating means for extinguishing said one tube, said charged capacitor being effective to bias said one tube negatively after said one tube is extinguished to render said one tube less sensitive to pulses gated thereto by said pulse gating means.

12. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to the calling line, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder activated by the coincidental occurrence of the pulses transmitted to said finder over said common pulse path with one of the units pulses in each pulse frame for gating a series of units pulses in each pulse frame one of which is gated coincidentally with the gating of said one group pulse by said first coincidence circuit means, means in said finder responsive to the group and units pulses coincidentally gated by said two coincidence circuit means for operatively associating said finder with the calling line, and means in said finder for preventing said first and second coincidence circuit means from gating group and units pulses respectively assigned to different ones of said lines in the event that a calling condition exists on two of said lines at the same time.

13. In an automatic telephone system, a plurality of lines having individually assigned thereto different time positions in repetitive time position frames, a line finder, means for sequentally transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to calling ones of said lines, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder activated by the coincidental occurrence of the pulses transmited to said finder over said common pulse path with one of the units pulses in each pulse frame for gating a series of units pulses in each pulse frame one of which is gated coincidentally with the gating of said one group pulse by said first coincidence circuit means, means in said finder responsive to the group and units pulses coincidentally gated by said two coincidence circuit means for operatively associating said finder with the calling line, and means in said finder for preventing said second coincidence circuit means from gating units pulses in any time positions other than those which occur coincidentally with said one group pulse gated by said first coincidence circuit means.

14. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to calling ones of said lines, first coincidence circuit means in said finder activated by the coincidental occurrence of the pulses transmitted to said finder over said common pulse path with one of the group pulses transmitted to said finder over said group pulse paths for gating said one group pulse in each time position frame, means in said finder responsive to gating of said one group pulse by said first coincidence circuit means for selecting those ones of the pulses transmitted over said common pulse path which occur during said one group pulse, second coincidence circuit means in said finder activated by the coincidental occurrence of said selected pulses with one of the units pulses in each pulse frame for gating a series of units pulses in each pulse frame one of which is gated coincidentally with the gating of said one group pulse by said first coincidence circuit means, and means in said finder responsive to the group and units pulses coincidentally gated by said two coincidence circuit means for operatively associating said finder with the calling line.

15. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to calling ones of said lines, first coincidence circuit means in said finder activated by the coincidental occurrence of the pulses transmitted to said finder over said common pulse path with one of the group pulses transmitted to said finder over said group pulse paths for gating said one group pulse in each time position frame, a gate tube in said finder, means for impressing said one group pulse on one control grid of said gate tube, means for impressing pulses transmitted over said common pulse path on another control grid of said gate tube, means for developing at the anode of said gate tube those ones of the pulses transmitted over said common pulse path which occur during said one group pulse, second coincidence circuit means in said finder activated by the coincidental occurrence of said developed pulses with one of the units pulses in each pulse frame for gating a series of units pulses in each pulse frame one of which is gated coincidentally with the gating of said one group pulse by said first coincidence circuit means, and means in said finder responsive to the group and units pulses coincidentally gated by said two coincidence circuit means for operatively associating said finder with the calling line.

16. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time position assigned to the calling line, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder activated by the coincidental occurrence of the pulses transmitted to said finder over said common pulse path with one of the units pulses in each pulse frame for gating a series of units pulses in each pulse frame one of which is gated coincidentally with the gating of said one group pulse by said first coincidence circuit means, means in said finder responsive to the group and units pulses coincidentally gated by said two coincidence circuit means for operatively associating said finder with the calling line, and means in said finder for preventing said first and second coincidence circuit means from simultaneously responding to different pulses transmitted to said finder over said common pulse path in the event that a calling condition exists on two of said lines at the same time.

17. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time position assigned to the calling line, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder activated by the coincidental occurrence of the pulses transmitted to said finder over said common pulse path with one of the units pulses in each pulse frame for gating a series of units pulses in each pulse frame one of which is gated coincidentally with the gating of said one group pulse by said first coincidence circuit means, means in said finder responsive to the group and units pulse coincidentally gated by said two coincidence circuit means for operatively associating said finder with the calling line, and means in said finder for preventing one of said coincidence circuit means from responding to pulses transmitted to said finder over said common pulse path until after the other of said coincidence circuit means has been activated.

18. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to calling ones of said lines, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder activated by the coincidental occurrence of the pulses transmitted to said finder over said common pulse path with one of the units pulses in each pulse frame for gating a series of units pulses in each pulse frame one of which is gated coincidentally with the gating of said one group pulse by said first coincidence circuit means, means in said finder responsive to the group and units pulses coincidentally gated by said two coincidence circuit means for operatively associating said finder with the calling line, and means in said finder for sequentially activating said coincidence circuit means to prevent false identification of a calling one of said lines.

19. In an automatic telephone system, a plurality of lines having individually assigned thereto different time positions in repetitive time position frames, a line finder, means for sequentially transmitting units pulses to said finder in each of said time positions over a group of units pulse paths, means for transmitting group pulses to said finder over a group of group pulse paths, a pulse path common to said lines, means responsive to the initiation of a call on any one of said lines for transmitting pulses to said finder over said common pulse path in the time positions assigned to calling ones of said lines, first coincidence circuit means in said finder activated by the coincidental occurrence of the pulses transmitted to said finder over said common pulse path with one of the group pulses transmitted to said finder over said group pulse paths for gating said one group pulse in each time position frame, second coincidence circuit means in said finder including a string of electric discharge tubes of the gaseous discharge type, means for sequentially impressing said units pulses on one control grid of said tubes, means for impressing calling line pulses transmitted over said common pulse path to another control grid of said tubes in parallel, means normally biasing said tubes sufficiently beyond cutoff to prevent said tubes from responding to coincidental impression of pulses on both control grids thereof, means controlled by said one group pulse gated by said first coincidence circuit means for reducing the bias on said tubes during said one group pulse, thereby to permit one of said tubes to fire upon coincidental occurrence of said units pulses and said calling line pulses, means controlled by said one tube for gating a series of units pulses in each pulse frame one of which is gated coincidentally with the gating of said one group pulse by said first coincidence circuit means, and means in said finder responsive to the group and units pulses coincidentally gated by said two coincidence circuit means for operatively associating said finder with the calling line.

References Cited in the file of this patent

UNITED STATES PATENTS

| | | |
|---|---|---|
| 2,465,355 | Cook | Mar. 29, 1949 |
| 2,475,625 | Lyons | July 12, 1949 |
| 2,490,833 | Ransom | Dec. 13, 1949 |
| 2,570,274 | Ransom | Oct. 9, 1951 |
| 2,631,194 | Reeves | Mar. 10, 1953 |
| 2,649,505 | Ransom | Aug. 18, 1953 |
| 2,747,021 | Chubb | May 22, 1956 |